(12) United States Patent
Hasegawa

(10) Patent No.: US 10,511,470 B2
(45) Date of Patent: Dec. 17, 2019

(54) TRANSMISSION DEVICE, COMMUNICATION DEVICE, TRANSMISSION SIGNAL GENERATION METHOD, RECEPTION DEVICE, AND DEMODULATION METHOD

(71) Applicant: Mitsubishi Electric Corporation, Chiyoda-ku (JP)

(72) Inventor: Fumihiro Hasegawa, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/773,764

(22) PCT Filed: Oct. 13, 2016

(86) PCT No.: PCT/JP2016/080445
§ 371 (c)(1),
(2) Date: May 4, 2018

(87) PCT Pub. No.: WO2017/081980
PCT Pub. Date: May 18, 2017

(65) Prior Publication Data
US 2018/0324020 A1 Nov. 8, 2018

(30) Foreign Application Priority Data
Nov. 10, 2015 (JP) ................................. 2015-220478

(51) Int. Cl.
*H04L 27/26* (2006.01)
*H04L 25/03* (2006.01)

(52) U.S. Cl.
CPC .... *H04L 27/2623* (2013.01); *H04L 25/03057* (2013.01); *H04L 27/265* (2013.01); *H04L 27/2636* (2013.01); *H04L 27/2644* (2013.01)

(58) Field of Classification Search
CPC . H04L 27/2623; H04L 27/26; H04L 27/2636; H04L 27/2644; H04L 27/265
See application file for complete search history.

(56) References Cited

U.S. PATENT DOCUMENTS 7,016,425 B1 * 3/2006 Kraiem ............... H04L 27/2602
329/304
9,680,681 B2 * 6/2017 Hasegawa ........... H04L 27/2602
(Continued)

FOREIGN PATENT DOCUMENTS

WO   WO 2008/020791 A1   2/2008

OTHER PUBLICATIONS

Boaz Porat, "4.5 Zero Padding in the Frequency Domain", A Course in Digital Signal Processing, 1997, pp. 106-107 and cover page.
(Continued)

*Primary Examiner* — Freshteh N Aghdam
(74) *Attorney, Agent, or Firm* — Oblon, McClelland, Maier & Neustadt, L.L.P.

(57) ABSTRACT

A transmission device includes: a data symbol generation unit; a static sequence generation unit generating a sequence of static symbols; a multiplexing unit generating a block signal in which static symbols are arranged in leading and trailing parts, while data symbols are arranged in a central part; a DFT unit transforming the block signal to a frequency-domain signal; a band reduction processing unit removing a predetermined number of signals in parts of both ends from the block signal after having been transformed to a frequency-domain signal; an interpolation processing unit performing interpolation processing on the block signal after a predetermined number of signals in parts of both ends have been removed; an IDFT unit transforming the block signal after having undergone the interpolation processing to a time-domain signal; and a transmission unit transmitting the block signal after having been transformed to a time-domain signal.

14 Claims, 16 Drawing Sheets

(56) References Cited

U.S. PATENT DOCUMENTS

| | | | |
|---|---|---|---|
| 2013/0028347 A1* | 1/2013 | Oga | H04L 5/0007 375/295 |
| 2015/0043324 A1* | 2/2015 | Oga | H04L 5/0007 370/210 |
| 2015/0312014 A1* | 10/2015 | Papasakellariou | H04L 5/0055 370/329 |

OTHER PUBLICATIONS

Benvenuto, N., et al., "Single Carrier Modulation With Nonlinear Frequency Domain Equalization: An Idea Whose Time Has Come-Again", Proceedings of the IEEE, vol. 98, No. 1, Jan. 2010, pp. 69-96.

Bingham, J. A. C., "Multicarrier Modulation for Data Transmission: An Idea Whose Time Has Come", IEEE Communications Magazine, vol. 28, No. 5, May 1990, pp. 5-8, 11-14.

Hasegawa, F., et al., "Static Sequence Embedded DFTs-OFDM", IEICE Technical Report, vol. 14, No. 490, RCS2014-326, Mar. 2015, pp. 147-152 (with English abstract).

Jiang, Y., et. al., "A New Out-of-Band Power Suppression Scheme by Extending Effective Cyclic—Prefix of OFDM" IEEE VTC, 2010-Spring, pp. 1-5.

Anderson, J.B., et al., "Faster-Than-Nyquist Signaling", Proceedings of the IEEE, vol. 101, No. 8, Aug. 2013, pp. 1817-1830.

Extended European Search Report dated May 23, 2019 in European Application No. 16863944.1.

Shigang Tang et al., "Iterative Channel Estimation for Unique-Word Based Single-Carrier Block Transmission", Tsinghua National Laboratory for Information Science and Technology (TNList), 2008 IEEE, pp. 741-744.

Changyuan Yu et al., "Decision-aided phase estimation in single carrier and OFDM coherent optical communication systems", ACP Technical Digest @ 2012 OSA, 4 pages.

Fumihiro Hasegawa et al., "Static Sequence Assisted Out-of-Band Power Suppression for DFT-s-OFDM", 2015 IEEE $26^{th}$ Symposium on Personal, Indoor and Mobile Radio Communications—(PIMRC): Fundamentals and PHY, pp. 61-66.

\* cited by examiner

TRANSMISSION DEVICE, COMMUNICATION DEVICE, TRANSMISSION SIGNAL GENERATION METHOD, RECEPTION DEVICE, AND DEMODULATION METHOD

FIELD

The present invention relates to a transmission device that performs block transmission, a communication device, a transmission signal generation method, a reception device, and a demodulation method.

BACKGROUND

In a digital communication system, multipath fading caused by a transmission signal reflected from buildings or the like and Doppler shift caused by movement of a terminal device cause frequency selective fading and time variability of a transmission path. In such a multipath environment, a received signal becomes a signal in which a transmitted symbol and a symbol that arrives after a lapse of a delay time interfere with each other.

For the frequency-selective transmission path as described above, a Single Carrier (SC) block transmission system intended for obtaining optimum reception characteristics has been recently drawn attention (see, for example, Non-patent Literature 1). The SC block transmission system can reduce a peak electric power as compared to an Orthogonal Frequency Division Multiplexing (OFDM) transmission system that belongs to Multiple Carrier (MC) block transmission (see, for example, Non-patent Literature 2).

For example, a transmitter that performs SC block transmission generates a Phase Shift Keying (PSK) signal or a Quadrature Amplitude Modulation (QAM) signal that is a digital modulation signal, then transforms this signal to a time-domain signal, and thereafter adds a Cyclic Prefix (CP) to the time-domain signal for the purpose of multipath fading compensation. In general, a transmitter performing SC block transmission carries out Discrete Courier Transform (DFT) processing in a precoder in order to minimize a transmission peak power.

The SC block transmission described in Non-patent Literatures 1 and 2 can minimize the transmission peak power while reducing the influence of multipath fading. However, in the SC block transmission, since the phase and amplitude between SC blocks are discontinuous, an out-of-band spectrum is caused. The out-of-band spectrum is also referred to as "out-of-band leakage power", and causes interference with adjacent channels. It is thus necessary to suppress the out-of-band spectrum. In a general communication system, a spectral mask is determined, and the out-of-band spectrum needs to be reduced so as to satisfy the spectral mask. To solve the problems as described above, Non-patent Literature 3 proposes a technique to insert static symbols into both ends of an SC block to thereby suppress the out-of-band spectrum. A transmitter described in Non-patent Literature 3 generates a data symbol and a static sequence that is a sequence of static symbols for each block, and multiplexes these symbols in a time domain, thereby generating an SC block having ends into which the static symbols are inserted.

CITATION LIST

Non Patent Literatures

Non-patent Literature 1: N. Benvenuto, R. Dinis, D. Falconer and S. Tomasin, "Single Carrier Modulation With Nonlinear Frequency Domain Equalization: An Idea Whose Time Has Come-Again", Proceedings of the IEEE, vol. 98, No. 1, Jan. 2010, pp. 69-96.

Non-patent Literature 2: J. A. C. Bingham, "Multicarrier Modulation for Data Transmission: An Idea Whose Time Has Come", IEEE Commun. Mag., vol. 28, No. 5, May 1990, pp. 5-14.

Non-patent Literature 3: Hasegawa, et al., "Static Sequence Embedded DFT-s-OFDM", IEICE technical report, vol. 14, no. 490, RCS2014-326, pp. 147-152, March 2015.

SUMMARY

Technical Problem

In a case where the conventional technique described in Non-patent Literature 3 is applied, an out-of-band spectrum can be suppressed in SC block transmission. However, there has been a problem that the frequency usage efficiency is degraded.

The present invention has been achieved in view of the above circumstances, and an object of the present invention is to provide a transmission device that can suppress an out-of-band spectrum and improve the frequency usage efficiency.

Solution to Problem

In order to solve the above-mentioned problems and achieve the object, the present invention provides a transmission device comprising: a data symbol generation unit to generate data symbols; a static sequence generation unit to generate a sequence of static symbols; and a multiplexing unit to generate a block signal based on the data symbols and the sequence of static symbols, the block signal having static symbols arranged in a leading part and a trailing part of the block signal, and having data symbols arranged in a remaining central part of the block signal. The transmission device further comprises: a time-to-frequency transform unit to transform the block signal to a frequency-domain signal; a band reduction processing unit to remove a predetermined number of signals in parts of both ends front the block signal after having been transformed to a frequency-domain signal; an interpolation processing unit to perform interpolation processing on the block signal after a predetermined number of signals in parts of both ends have been removed by the band reduction processing unit; a frequency-to-time transform unit to transform the block signal after having undergone the interpolation processing to a time-domain signal; and a transmission unit to transmit the block signal to a counterpart device.

Advantageous Effects of Invention

According to the present invention, there is an advantageous effect in that it is possible to provide a transmission device that can suppress an out-of-band spectrum and improve the frequency usage efficiency. Further, it is possible to exert high multipath fading resistance, band reduction effect, and out-of-band spectrum suppression without adding a Cyclic Prefix.

DESCRIPTION OF EMBODIMENTS

A transmission device, a communication device, a transmission signal generation method, a reception device, and a demodulation method according to embodiments of the present invention will be described in detail below with reference to the drawings. The present invention is not necessarily limited by these embodiments.

First Embodiment

Figure 1:
FIG. 1 is a diagram illustrating an example of a communication system constituted by including a transmission device and a reception device according to a first embodiment.

FIG. 1 is a diagram illustrating an example of a communication system configured by including a transmission device and a reception device according to a first embodiment of the present invention. The communication system according to the present embodiment includes a transmission device 1 and a reception device 2, and performs SC block transmission from the transmission device 1 to the reception device 2. It is noted that the communication system performing SC block transmission may be configured to have two communication devices each of which includes the transmission device 1 and the reception device 2, in which the communication devices perform SC block transmission bidirectionally.

Figure 2:
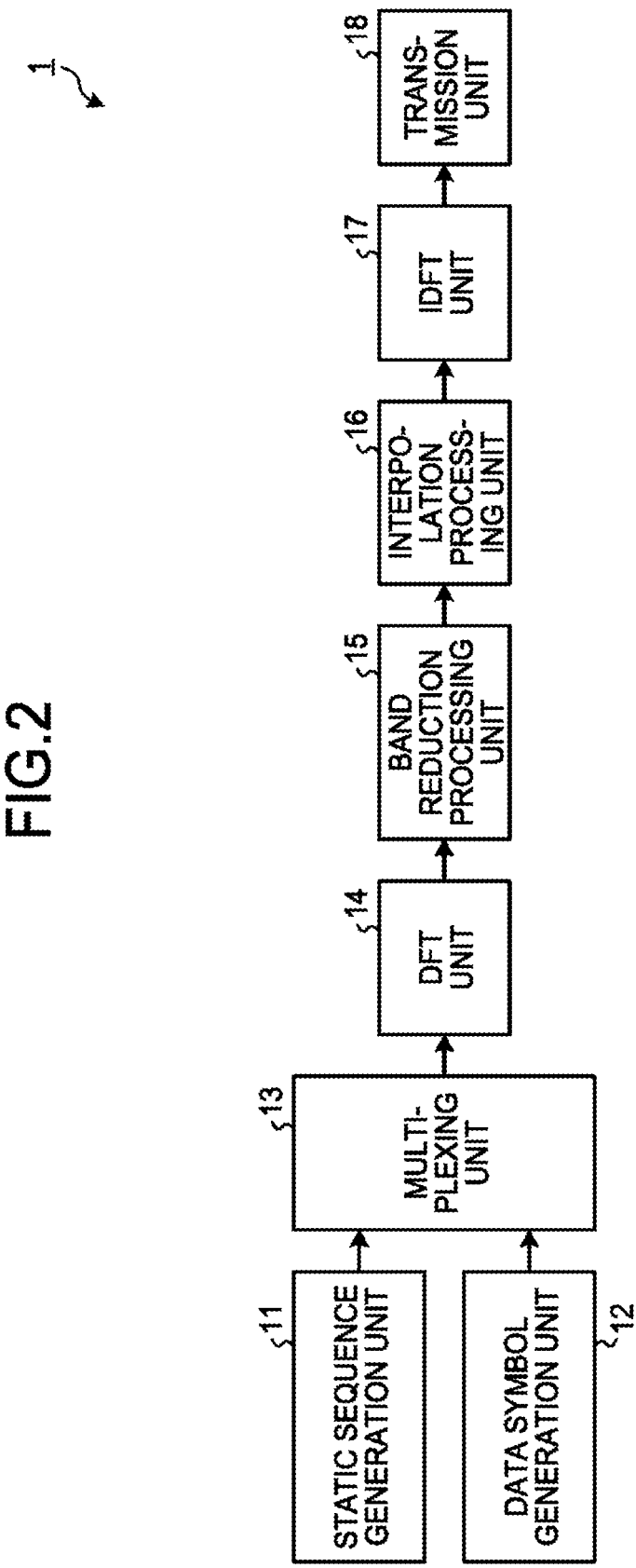
FIG. 2 is a diagram illustrating a configuration example of the transmission device according to the first embodiment.

FIG. 2 is a diagram illustrating a configuration example of the transmission device 1 according to the first embodiment. The transmission device 1 according to the present embodiment includes a static sequence generation unit 11, a data symbol generation unit 12, a multiplexing unit 13, a Discrete Fourier Transform (UFT) unit 14, a band reduction processing unit 15, an interpolation processing unit 16, an Inverse Discrete Fourier Transform (IDFT) unit 17, and a transmission unit 18. The transmission device 1 constitutes a communication device on a transmission side that performs Single Carrier (SC) block transmission. FIG. 2 illustrates only a configuration necessary for explaining an operation of the present invention, in which configurations required for a general transmission device are partially omitted in illustration thereof.

The static sequence generation unit 11 generates a sequence of static symbols whose signal values are preset. Hereinafter, the sequence generated by the static sequence generation unit 11 is referred to as "sequence of static symbols". The sequence of static symbols is a symbol sequence to be inserted into an SC block in order to suppress an out-of-band spectrum, and is a symbol sequence to be inserted as a common value between SC blocks. The static sequence generation unit 11 generates a sequence of static symbols on a block-by-block basis in SC block transmission, and outputs the generated sequence of static symbols to the multiplexing unit 13.

The data symbol generation unit 12 generates a data symbol such as a Phase Shift Keying (PSK) symbol or a Quadrature Amplitude Modulation (QAM) symbol on the basis of information data to be transmitted to the reception device 2. The data symbol generation unit 12 generates data symbols on a block-by-block basis in SC block transmission, and outputs the generated data symbols to the multiplexing unit 13.

The multiplexing unit 13 adds the sequence of static symbols generated by the static sequence generation unit 11 to the data symbols generated by the data symbol generation unit 12 to generate a block signal that is an SC block having ends in each of which the sequence of static symbols is inserted. The transmission device 1 is configured to include the static sequence generation unit 11 and the multiplexing unit 13 and to generate an SC block having ends in each of which the sequence of static symbols is inserted, and thereby can suppress an out-of-band spectrum in SC block transmission.

The DFT unit 14 is a time-to-frequency transform unit that performs SFT, that is, Fourier transform on the SC block generated by the multiplexing unit 13 so as to transform the SC block from a time-domain signal to a frequency-domain signal.

The band reduction processing unit 15 performs band reduction processing on the SC block after having been transformed to a frequency-domain signal by the DFT unit 14 to reduce the band, and outputs the SC block signal with a reduced band to the interpolation processing unit 16. While an operation of the band reduction processing unit 15 to reduce the band is described below in detail, by the transmission device 1 being configured to include the band reduction processing unit 15, it is possible to improve the frequency usage efficiency in SC block transmission.

The interpolation processing unit 16 performs interpolation processing on an input signal from the band reduction processing unit 15, that is, a frequency-domain SC block after having undergone the band reduction processing. For example, the interpolation processing is oversampling. Where the number of input signals to the interpolation processing unit 16 is represented as N and the oversampling rate is represented as L, the number of output signals from the interpolation processing unit 16 is LN. In a case of performing oversampling as the interpolation processing, the interpolation processing unit 16 inserts a zero into an input signal from the band reduction processing unit 15. In this case, the interpolation processing unit 16 inserts a zero into the input signal by using, for example, the method described in a document "B. Porat, "A Course in Digital Signal Processing", John Wiley and Sons Inc., 1997.".

The IDFT unit 17 is a frequency-to-time transform unit that performs IDFT, that is, inverse Fourier transform on a frequency-domain SC block after having undergone the interpolation processing by the interpolation processing unit 16 so as to transform the frequency-domain SC block to a time-domain signal. In the following descriptions, a single piece of data that is outputted from the IDFT unit 17 is sometimes referred to as "sample".

The transmission unit 18 performs at least transform processing on a SC block after having been transformed to the time-domain signal by the IDFT unit 17 so as to transform the SC block to a radio-frequency band signal, and then transmits this signal to the reception device 2 that serves as a counterpart device.

Next, an operation of the transmission device 1 according to the present embodiment is described in detail. In the present embodiment, description is given for an example in which the static sequence generation unit 11 generates a sequence of static symbols consisting of M symbols, and the multiplexing unit 13 generates a single SC block consisting of $N_D$ symbols.

In a case of generating a single SC block in the transmission device 1, the static sequence generation unit 11 generates symbols $F_{-M/2}, F_{-M/2+1}, \ldots, F_{-1}, F_0, F_1, \ldots, F_{M/2-2}, F_{M/2-1}$ as a sequence of static symbols formed of M symbols, and outputs the sequence of static symbols to the multiplexing unit 13. Meanwhile, the data symbol generation unit 12 generates and outputs ($N_D$–M) data symbols $d_1, \ldots, d_{ND-M}$ to the multiplexing unit 13. Note that "ND" in the subscript "ND–M" added to "d" herein means "$N_D$". In the present embodiment, for the sake of simplicity of descriptions, M is assumed to be an even number. However, M may be an odd number.

Any sequence may be used for a sequence of static symbols generated by the static sequence generation unit 11. It is possible to use a Zadoff-Chu sequence, a zero sequence, or other sequences as a sequence of static symbols.

Figure 3:
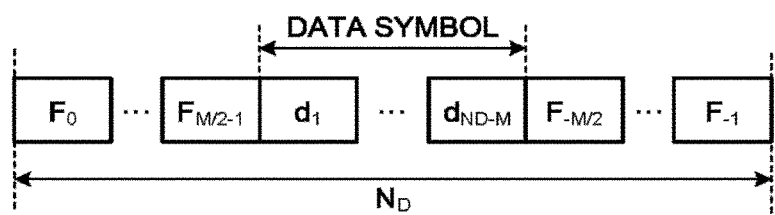
FIG. 3 is a diagram illustrating an example of a signal generated by a multiplexing unit according to the first embodiment.
Figure 4:
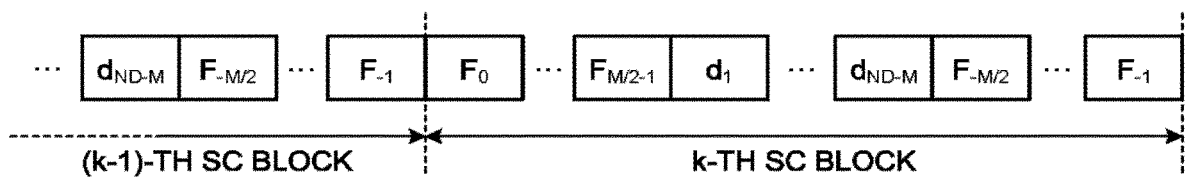
FIG. 4 is a diagram illustrating an example of relation between a (k−1)-th signal and a k-th signal generated by the multiplexing unit according to the first embodiment.

The multiplexing unit 13 divides the sequence of static symbols inputed from the static sequence generation unit 11 into two which are a first sequence on the leading side and a second sequence on the trailing side, and adds the second sequence to the leading end of the ($N_D$–M) data symbols inputted from the data symbol generation unit 12, while adding the first sequence to the trailing end of the ($N_D$–M) data symbols. Where M is an even number, the multiplexing unit 13 divides the sequence of static symbols into, for example, a first sequence and a second sequence, the first sequence being a first half of the M symbols, $F_{-M/2}, F_{-M/2+1}, \ldots, F_{-1}$, and the second sequence being a second half of the M symbols, $F_0, F_1, \ldots, F_{M/2-2}, F_{M/2-1}$. As illustrated in FIG. 3, the multiplexing unit 13 then adds the second half $F_0, F_1, \ldots, F_{M/2-2}, F_{M/2-1}$ to the leading end of the data symbols $d_1, \ldots, d_{ND-M}$, while adding the first half $F_{-M/2}, F_{-M/2+}, \ldots, F_{-1}$ to the trailing end of the data symbols $d_1, \ldots, d_{ND-M}$. As a result, a single SC block consisting of $N_D$ symbols is generated. By the multiplexing unit 13 generating the SC block in this manner, the M/2 symbols $F_0, F_1, \ldots, F_{M/2-2}, F_{M/2-1}$ arranged in the leading part of the SC block can continue from the M/2 symbols $F_{-M/2}, F_{-M/2+1}, \ldots, F_{-1}$ arranged in the trailing part of the immediately-previous SC block, that is, a SC block generated by the previous processing, as illustrated in FIG. 4. The multiplexing unit 13 outputs, as a time-domain SC block, the generated SC block, that is, a SC block in which the total M static symbols are arranged in the leading part and the trailing part, while data symbols are arranged in the remaining central part, to the DFT unit 14.

Where M is an odd number, the multiplexing unit 13 divides the sequence of static symbols into one group of (M+1)/2 symbols and another group of (M−1)/2 symbols. In the above descriptions, the multiplexing unit 13 divides the sequence of static symbols into two groups having equal numbers of symbols, that is, M/2 symbols for each group. However, the multiplexing unit 13 may divide the sequence of static symbols into two groups having different numbers of symbols, for example, $M_1$ symbols for one group and $M_2$ symbols for another group ($0<M_1$, $0<M_2$, $M_1+M_2+M$, and $M_1 \neq M_2$). In the following descriptions, the multiplexing unit 13 is assumed to divide the sequence of static symbols into two groups with equal numbers of symbols for the sake of simplicity of descriptions.

When a time-domain SC block that is a time-domain signal is inputted from the multiplexing unit 13 to the DFT unit 14, the DFT unit 14 performs DFT on the time-domain SC block to transform it to a frequency-domain signal, and then outputs the frequency-domain signal as a frequency-domain SC block to the band reduction processing unit 15. In the present embodiment, the number of output signals from the DFT unit 14 is $N_D$.

Figure 5:
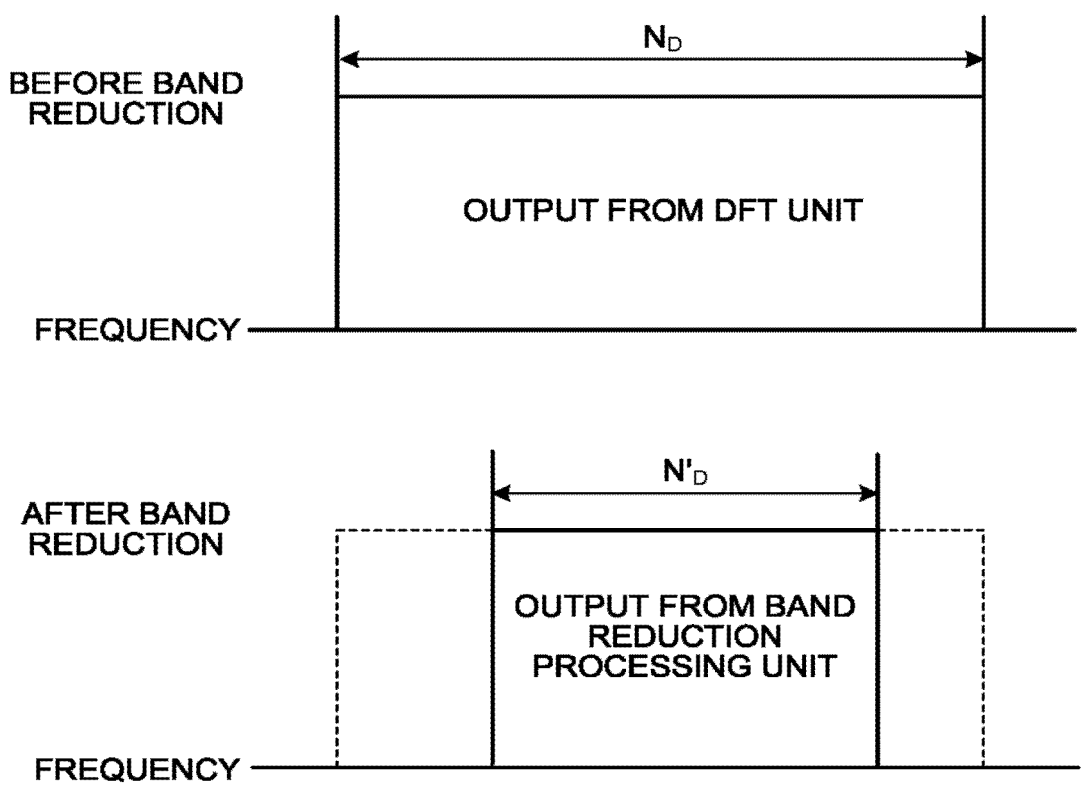
FIG. 5 is a diagram illustrating an example of an operation of a band reduction processing unit according to the first embodiment.

As illustrated in FIG. 5, the band reduction processing unit 15 removes a predetermined number of signals for the end parts from $N_D$ signals outputted from the DFT unit 14, and outputs the remaining signals to the interpolation processing unit 16. The number of output signals from the band reduction processing unit 15 is represented as $N'_D$. There are various methods for the band reduction processing unit 15 to remove a signal for each end part from $N_D$ signals, but any of the methods may be used. For example, the band reduction processing unit 15 uses a low-pass filter to remove the signal for each end part. FIG. 5 is a diagram illustrating an example of an operation of the band reduction processing unit 15. Where ($N_D$−$N'_D$) is an even number, the band reduction processing unit 15 removes ($N_D$−$N'_D$)/2 signals from each end of $N_D$ signals outputted from the DFT unit 14. There are no limitations on $N'_D$. It is permissible that $N_D$−$N'_D$>M or $N_D$−$N'_D \leq M$.

The operation of the band reduction processing unit 15 is described below using a specific example. In this example, the number of signals to be outputted from the DFT unit 14 at the time of generating a single SC block, that is, the number of symbols to be inputted to the band reduction processing unit 15 is set to $N_D$=16, and 16 symbols outputted from the DFT unit 14 are represented as $S_{k,0}, S_{k,1}, \ldots, S_{k,15}$. A symbol $S_{k,n}$ means the n-th symbol in outputs from the DFT unit 14 for the k-th block. As an example, where the output of the band reduction processing unit 15 is set to have $N'_D$=10, the band reduction processing unit 15 outputs $S_{k,3}, S_{k,4}, \ldots, S_{k,12}$. That is, the band reduction processing unit 15 removes three symbols from each end of the 16 symbols inputted from the DFT unit 14.

As the number of signals is reduced from $N_D$ to $N'_D$ ($N'_D<N_D$), the frequency band is reduced, and narrow-band information transmission becomes possible. As described above, the multiplexing unit 13 generates a SC block in which sequences of static symbols are inserted in the leading part and the trailing part. Accordingly, phase continuity is maintained between two consecutive SC blocks, and consequently an out-of-band spectrum is suppressed.

The interpolation processing unit 16 performs the interpolation processing on a frequency-domain SC block whose band has been reduced, that is a signal formed of $N'_D$ symbols inputted from the band reduction processing unit 15. For example, the interpolation processing unit 16 performs oversampling such as zero padding on a frequency-domain SC block whose band has been reduced, which is formed of $N'_D$ symbols, inputted from the band reduction processing unit 15, so as to generate a frequency-domain SC block formed of LN symbols. That is, the interpolation processing unit 16 inserts (LN-$N'_D$) zeros into a signal consisting of $N'_D$ symbols inputted from the band reduction processing unit 15. The interpolation processing unit 16 outputs the generated frequency-domain SC block, that is, a frequency-domain SC block after having undergone the interpolation processing to the IDFT unit 17.

The IDFT unit 17 performs IDFT on the frequency-domain SC block formed of the LN symbols inputted from the interpolation processing unit 16 to transform the frequency-domain signal to a time-domain signal, and outputs a SC block consisting of LN samples.

The transmission unit 18 transforms a signal inputted from the IDFT unit 17 to a radio-frequency band signal, and transmits this signal through an antenna (not illustrated). By a configuration such that the static sequence generation unit 11 generates a sequence of static symbols and the multiplexing unit 13 adds the sequence of static symbols to the data symbols, the sequence of static symbols plays a role of a Cyclic Prefix (CP) that has been conventionally required for measures against multipath fading, and so it is unnecessary to add the CP to a SC block.

Figure 6:
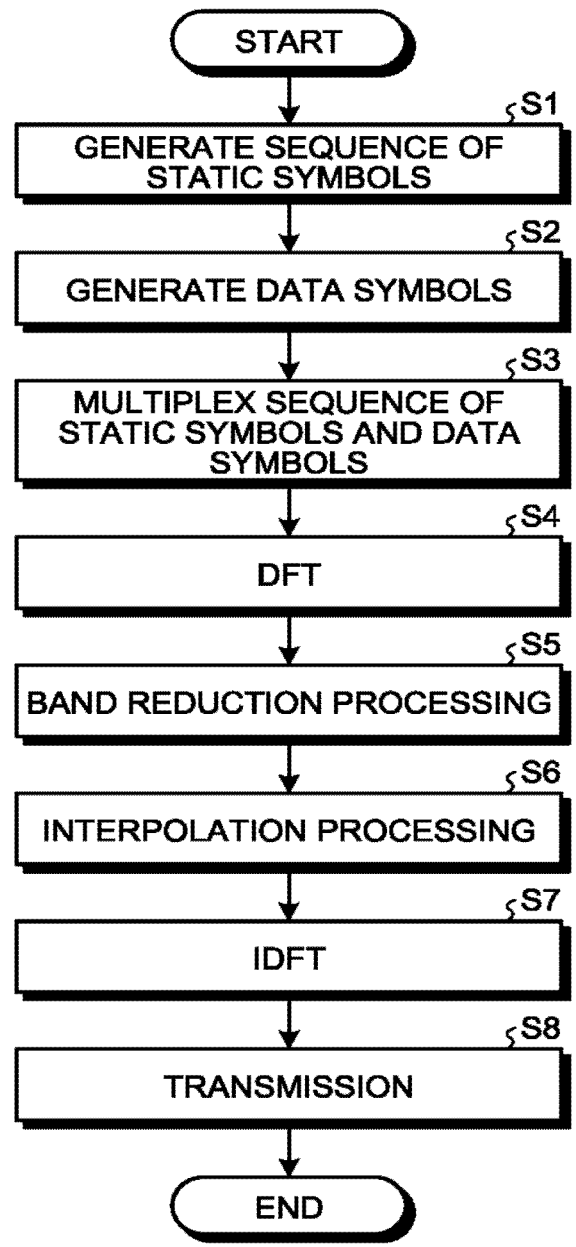
FIG. 6 is a flowchart illustrating an operation of the transmission device according to the first embodiment to generate an SC block and transmit the SC block to the reception device.

FIG. 6 is a flowchart illustrating the operation of the transmission device 1 to generate a SC block as a transmission signal and transmit the SC block to the reception device 2.

As illustrated in FIG. 6, first the transmission device 1 generates a sequence of static symbols and data symbols (Steps S1 and S2). At Step S1, the static sequence generation unit 11 generates the sequence of static symbols. At Step S2, the data symbol generation unit 12 generates the data symbols. Generation of the sequence of static symbols may precede generation of the data symbols and vice versa, or the former and the latter may be executed in parallel. The static sequence generation unit 11 may be configured to hold a sequence of static symbols, for example by storing the sequence of static symbols in an internal memory thereof, and then outputs the sequence of static symbols in accordance with a timing of when the data symbol generation unit 12 generates and outputs the data symbols.

Next, the transmission device I multiplexes the generated sequence of static symbols and the data symbols to generate a SC block (Step S3). At Step S3, the multiplexing unit 13 receives the sequence of static symbols generated by the static sequence generation unit 11 and the data symbols generated by the data symbol generation unit 12, and multiplexes these symbols to generate the SC block. As described above, specifically, the multiplexing unit 13 generates the SC block in which the static symbols are inserted in the leading part and the trailing part, while the data symbols are inserted in the central part.

Subsequently, the transmission device 1 performs DPT on the SC block generated at Step S3 (Step S4). At Step S4, the DFT unit 14 performs DDT on the SC block generated at Step S3 to transform the SC block to a frequency-domain signal.

Next, the transmission device 1 performs band reduction processing on the SC block after having been transformed to a frequency-domain signal (Step S5). At Step S5, the band reduction processing unit 15 removes the symbols of each end part of the frequency-domain SC block.

Subsequently, the transmission device 1 performs interpolation processing on the SC block whose band has been reduced, which has been obtained by performing the band reduction processing at Step S5 (Step S6). At Step S6, the interpolation processing unit 16 performs oversampling such as zero padding on the SC block whose band has been reduced.

Next, the transmission device 1 performs IDFT on the SC block after having undergone the interpolation processing at Step S6 (Step S7). At Step S7, the IDFT unit 17 performs IDFT on the SC block after having undergone the interpolation processing to transform the SC block to a time-domain signal.

Lastly, the transmission device 1 transmits the SC block after having been transformed to a time-domain signal at Step Si to the reception device 2 (Step S8). At Step S8, the transmission unit 18 transmits the SC block inputted from the IDFT unit 17 to the reception device 2.

Subsequently, description is given for a hardware configuration to implement constituent elements of the transmission device 1 illustrated in FIG. 2. The data symbol generation unit 12 can be implemented by a modem or a modulator. The DFT unit 14 and the IDFT unit 17 can be implemented by an electronic circuit using a flip-flop circuit, a shift register, and the like. The transmission unit 18 can be implemented by a transmitter. The static sequence generation unit 11, the multiplexing unit 13, the band reduction processing unit 15, and the interpolation processing unit 16 can be implemented by hardware 100 illustrated in FIG. 7, that is, an input unit 101, a processing circuit 102, a memory 103, and an output unit 104.

Figure 7:
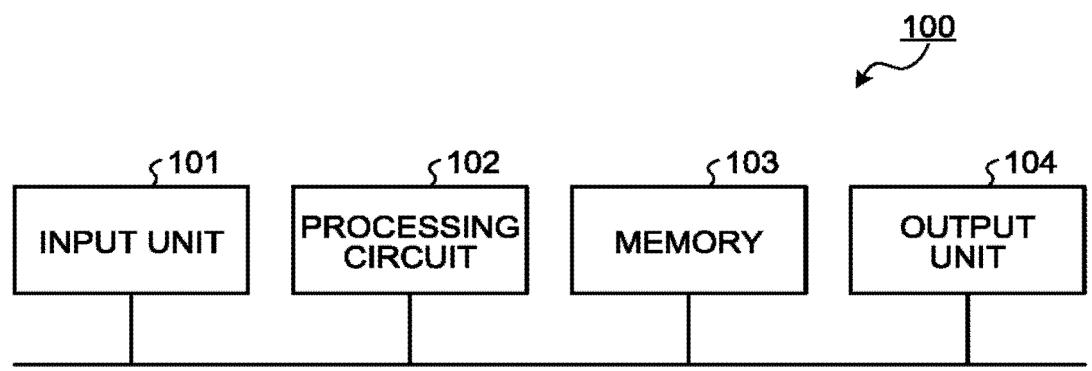
FIG. 7 is a diagram illustrating an example of hardware implementing constituent elements of the transmission device according to the first embodiment.

In the hardware 100 illustrated in FIG. 7, the input unit 101 is an interface circuit that receives data inputted from outside, and provides the received data to the processing circuit 102. The processing circuit 102 is dedicated hardware, that is, an electronic circuit, or a processor that performs processing for the corresponding constituent element. The processor is, for example, a Central Processing Unit (CPU, which is also referred to as "processing device", "computing device", "microprocessor", "microcomputer", "processor", or "DSP"), or a system Large Scale Integration (LSI). The memory 103 is a nonvolatile or volatile semiconductor memory such as a Random Access Memory (RAM), a Read Only Memory (ROM), a flash memory, an Erasable Programmable Read Only Memory (EPROM), or an Electrically Erasable Programmable Read Only Memory (EEPROM), or is a magnetic disk, a flexible disk, an optical disk, a compact disk, a minidisc, a Digital Versatile Disc (DVD), or the like. The output unit 104 is an interface circuit that transmits data from the processing circuit 102 or the memory 103 to outside.

When the processing circuit 102 is a dedicated electronic circuit, then the processing circuit 102 corresponds to a single circuit, a composite circuit, a programmed processor, a parallel-programmed processor, an Application Specific Integrated Circuit (ASIC), a Field Programmable Gate Array (FPGA), or a combination thereof.

When the processing circuit 102 is a processor, the static sequence generation unit 11, the multiplexing unit 13, the band reduction processing unit 15, and the interpolation processing unit 16 are implemented by software, firmware, or a combination of software and firmware. The software or the firmware is described as a program and is stored in the memory 103. The processing circuit 102, that is, the processor reads and executes programs for causing the processor to operate as the transmission device 1, which has been stored in the memory 103, thereby implementing the static sequence generation unit 11, the multiplexing unit 13, the band reduction processing unit 15, and the interpolation processing unit 16 in the transmission device 1. The programs stored in the memory 103 are also regarded as causing a computer to implement the static sequence generation unit 11, the multiplexing unit 13, the band reduction processing unit 15, and the interpolation processing unit 16.

It is noted that each of the static sequence generation unit 11, the multiplexing unit 13, the band reduction processing unit 15, and the interpolation processing unit 16 may be partially implemented by a dedicated electronic circuit, while being partially implemented by software or firmware. For example, the static sequence generation unit 11 may be implemented by a dedicated electronic circuit, and the remaining components including the multiplexing unit 13 may be implemented in function by a processor serving as the processing circuit 102 reading and executing the programs stored in the memory 103.

In this manner, the processing circuit 102 can implement the static sequence generation unit 11, the multiplexing unit 13, and other units by dedicated hardware, software, firmware, or a combination thereof.

As described above, the transmission device 1 according to the present embodiment generates a block signal to be transmitted as a single SC block in which static symbols are inserted in the leading part and the trailing part, performs band reduction processing and interpolation processing on the generated block signal in a frequency domain, and transmits the signal obtained by the processings to the reception device 2. By so doing, it is possible to suppress an increase in an out-of-band spectrum, and improve the frequency usage efficiency with the band to be used for signal transmission being narrowed.

Second Embodiment

Next, a reception device that receives a block signal transmitted from the transmission device according to the first embodiment, that is, the reception device 2 illustrated in FIG. 1 is described.

The reception device that receives a block signal described above is capable of estimating a transmission path by using a sequence of static symbols included in the block signal. However, in a case where a block signal is transmitted in a multipath environment, there is a problem in that the block signal received by the reception device is brought into a state in which data components are multiplexed in a section where static symbols are arranged, thereby leading to degradation of the accuracy in estimating a transmission path. The reception device 2 according to a second embodiment is configured as described below to solve the problem regarding the degradation in estimation accuracy.

Figure 8:
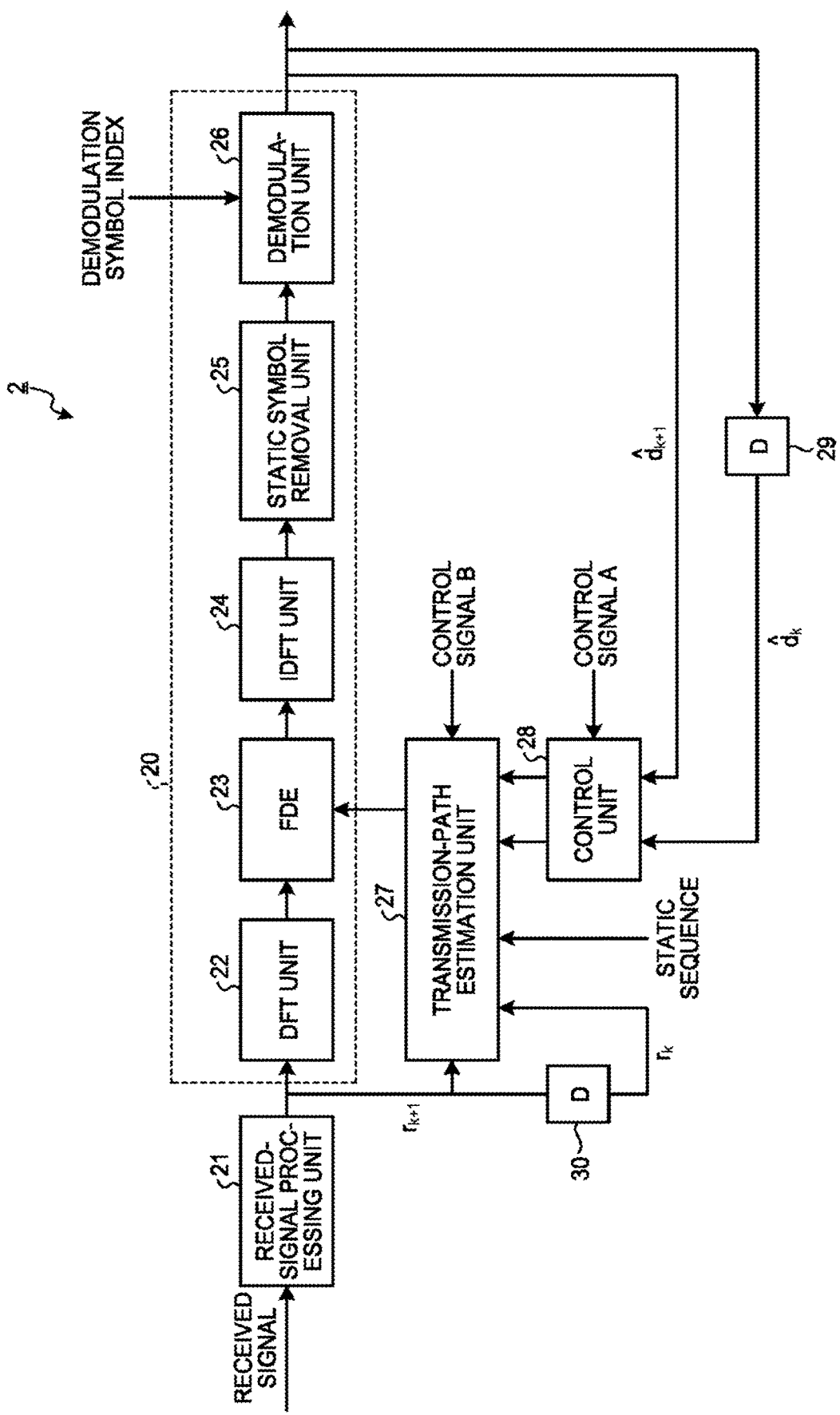
FIG. 8 is a diagram illustrating a configuration example of a reception device according to a second embodiment.

FIG. 8 is a diagram illustrating a configuration example of the reception device according to the second embodiment. The reception device 2 according to the present embodiment includes a received-signal processing unit 21, a DFT unit 22, a Frequency Domain Equalizer (FDE) 2, an IDFT unit 24, a static symbol removal unit 25, a demodulation unit 26, a transmission-path estimation unit 27, and a control unit 28, and constitutes a communication device on the receiver side of a communication system that performs SC block transmission. FIG. 8 illustrates a configuration necessary for explaining the operation of the present invention, in which illustrations of necessary configurations for a general reception device are partially omitted. Each of constituent elements described as "D" and denoted by reference numerals 29 and 30 is a storage unit that temporarily stores a signal inputted therein. When signals are inputted to the storage units 29 and 30, the storage units 29 and 30 hold the signals, and then output the signals held therein at a predetermined timing. The DFT unit 22, the FOE 23, the IDFT unit 24, the static symbol removal unit 25, and the demodulation unit 26 constitute a block signal demodulation unit 20.

The received-signal processing unit 21 performs inverse processing to the processing performed by the transmission unit le of the transmission device 1, on an inputted received signal, that is, a signal received from the transmission device 1 illustrated in FIG. 1 to generate a signal to be inputted to the DFT unit 22, the transmission-path estimation unit 27, and the storage unit 30.

The DFT unit performs FL-point DFT on an input signal from the received-signal processing unit 21 to transform the input signal from a time-domain signal to a frequency-domain signal. The DFT unit 22 outputs the frequency-domain signal obtained by performing the transform processing to the FDE 23.

The FDE 23 uses a transmission-path estimation value inputted from the transmission-path estimation unit 27 to perform equalization processing on the frequency-domain signal inputted from the DFT unit 22. The FEE 23 outputs a signal obtained by performing the equalization processing in the frequency domain to the IDFT unit 24.

The IDFT unit 24 performs IDFT on the signal after having undergone the equalization processing in the FDE 23 to transform the signal to a time-domain signal. As described in the first embodiment, in the transmission device 1, the band reduction processing unit 15 performs band reduction processing in the frequency domain to obtain $N'_D$ signals. To this end, the IDFT unit 24 performs zero padding on an input signal from the FEE 23 prior to the IDFT processing to obtain $N_D$ frequency-domain signals. The IDFT unit 24 outputs a time-domain signal obtained by performing the transform processing to the static symbol removal unit 25.

The static symbol removal unit 25 removes static symbols included in the signal after having been transformed to a time-domain signal by the IDFT unit 24. An operation of the static symbol removal unit 25 to remove static symbols is described separately below in detail. The static symbol removal unit 25 outputs a signal from which the static symbols have been removed to the demodulation unit 26.

The demodulation unit 26 demodulates data symbols included in the signal from which the static symbols have been removed by the static symbol removal unit 25.

The transmission-path estimation unit 27 estimates the state of the transmission path between the transmission device 1 and the reception device 2. An operation of the transmission-path estimation unit 27 to estimate the state of the transmission path is described separately below in detail. The transmission-path estimation unit 27 outputs a transmission-path estimation value obtained by estimating the state of the transmission path to the FDE 23.

When the control unit 28 receives demodulated data symbols that are the data symbols obtained by the demodulation by the demodulation unit 26 and a control signal A instructs the control unit 28 to output the demodulated data symbols, the control unit 28 outputs the demodulated data symbols received from the demodulation unit 26 to the transmission-path estimation unit 27.

The operation of the static symbol removal unit 25 is now described. First, the static symbol removal unit 25 generates signal vectors F(bold-faced)$_0$ and F(bold-faced)$_1$ expressed by the following equation (1) as signal vectors constructed of static symbols. "T" means transpose of a vector. The same applies to other formulas described below.

[Formula 1]

$$F_0 = \left[F_0, F_1, \ldots, F_{\frac{M}{2}-1}\right]^T \quad (1)$$
$$F_1 = \left[F_{-\frac{M}{2}}, F_{-\frac{M}{2}+1}, \ldots, F_{-1}\right]^T$$

Next, the static symbol removal unit 25 generates a signal vector expressed by the following equation (2). In the equation (2), 0(bold-faced)$_{ND-M}$ is a column vector constructed of ($N_D$–M) zeros, that is, ($N_D$–M) zero symbols. "ND" of the subscript "ND–M" added to "0(bold-faced)" means "$N_D$". The same applies to the following descriptions.

[Formula 2]

$$Z_F = [F_0^T, 0_{N_D-M}^T, F_1^T]^T \quad (2)$$

Subsequently, the static symbol removal unit 25 performs $N_D$-point DFT on Z(bold-faced)$_F$ expressed by the equation (2). The static symbol removal unit 25 may perform zero padding that is equivalent to the oversampling processing after the DFT processing has been performed so as to increase the signal points to N points. Any zero padding method may be used. For example, use can be made of the method described in Document "B. Porat, "A Course in Digital Signal Processing", John Wiley and Sons Inc., 1997.". In this example, the oversampling rate is set to L=1.

Next, the static symbol removal unit 25 performs band reduction processing on $N_D$, signals obtained by performing the DFT processing, in the same manner as the processing performed by the band reduction processing unit 15 in the transmission device 1. That is, the static symbol removal unit 25 removes a predetermined number of signals in parts of both ends from the $N_D$ signals obtained by performing the DFT processing.

Subsequently, the static symbol removal unit 25 performs $N_D$-point IDFT processing on the signal obtained by performing band reduction processing to generate a signal vector d(bold-faced)$_z$. Where an output from the IDFT unit 24 is expressed by the following equation (3), static symbol removal processing to be performed by the static symbol removal unit 25 is expressed by the following equation (4).

[Formula 3]

$$\hat{d}_k \quad (3)$$

[Formula 4]

$$\tilde{d}_k = \hat{d}_k - d_z \quad (4)$$

The static symbol removal unit 25 may be configured to perform normalization processing such as electric power normalization in the static symbol removal processing.

A signal vector obtained by performing the static symbol removal processing by the static symbol removal unit 25 becomes an output signal to the demodulation unit 26. In addition to the signal vector outputted from the static symbol removal unit 25, a demodulation symbol index is inputted to the demodulation unit 26. The demodulation symbol index refers to information that instructs which symbol of the symbols, included in a signal vector outputted from the static symbol removal unit 25, is to be demodulated. For example, in a case where a signal vector having a construction illustrated in FIG. 3 is outputted, when the index at the position of $F_0$ is "0" and the index at the position of $F_{-1}$ is "$N_D$–1", then symbol indexes to be demodulated are "M/2", "M/2+1", . . . , "$N_D$–M/2–1" which refer to data symbols. Because data components are not included in a static sequence, the static sequence is not to be demodulated.

Next, the transmission-path estimation unit 27 is described. The operation of the transmission-path estimation unit 27 is briefly described below. The transmission-path estimation unit 27 obtains an initial value of a transmission-path estimation value. When data symbols are demodulated by using this initial value, the transmission-path estimation unit 27 receives the data symbols obtained by the demodulation. By using the received data symbols, the transmission-path estimation unit 27 obtains a transmission-path estimation value again. The transmission-path estimation unit 27 obtains the initial value of the transmission-paths estimation value on the basis of a first SC block that is a received signal to be demodulated, a second SC block having been received at the immediately-previous timing, and a static sequence. Further, the transmission-path estimation unit 27 uses the first SC block, the second SC block, the static sequence, the data symbols of the first SC block obtained by the demodulation, and the data symbols of the second SC block obtained by the demodulation to obtain the transmission-path estimation value again. The transmission-path estimation unit 27 is described below in detail.

First, an input signal to the transmission-path estimation unit 27 is described. In this description, estimation of a transmission path in a case where a signal for the (k+1)-th block is received as an example. An input signal to the transmission-path estimation unit 27 differs between the case of calculating the initial value of the transmission-path estimation value and the case of calculating the transmission-path estimation value again. In the case of calculating the initial value of the transmission-path estimation value, a received signal of the (k+1)-th block and a received signal of the k-th block are inputted to the transmission-path estimation unit 27. That is, a received signal r(bold-faced)$_{k+1}$ of the (k+1)-th block and a received signal r(bold-faced)$_k$ of the k-th block are inputted to the transmission-path estimation unit 27. A sequence of static symbols to be inserted in the data symbols by the transmission device 1 is inputted to the transmission-path estimation unit 27 as a static sequence, the said sequence of static symbols being a sequence of static symbols $F_0$, $F_1$, . . . , $F_{M/2-1}$, $F_{-M/2}$, . . . , $F_{-1}$ that is equal to the sequence of static symbols generated by the static sequence generation unit 11. The transmission-path estimation unit 27 uses these received signals of the (k+1)-th and k-th blocks as well as the static sequence to calculate the initial value of the transmission-path estimation value. In the case of calculating the transmission-path estimation value again, data symbols obtained by the demodulation using the initial value of the transmission-path estimation value are further inputted to the transmission-path estimation unit Specifically, demodulated data symbols expressed by the following expression (5), and demodulated data symbols expressed by the following expression (6) are inputted to the transmission-path estimation unit 27.

[Formula 5]

$$\hat{d}_k \quad (5)$$

[Formula 6]

$$\hat{d}_{k+1} \quad (6)$$

These demodulated data symbols are inputted to the transmission-path estimation unit 27 through the control unit 28. In the operation to calculate the transmission-path estimation again, the transmission-path estimation unit 27 uses the data symbols obtained by the demodulation in addition to the input values used to calculate the initial value.

Figure 9:
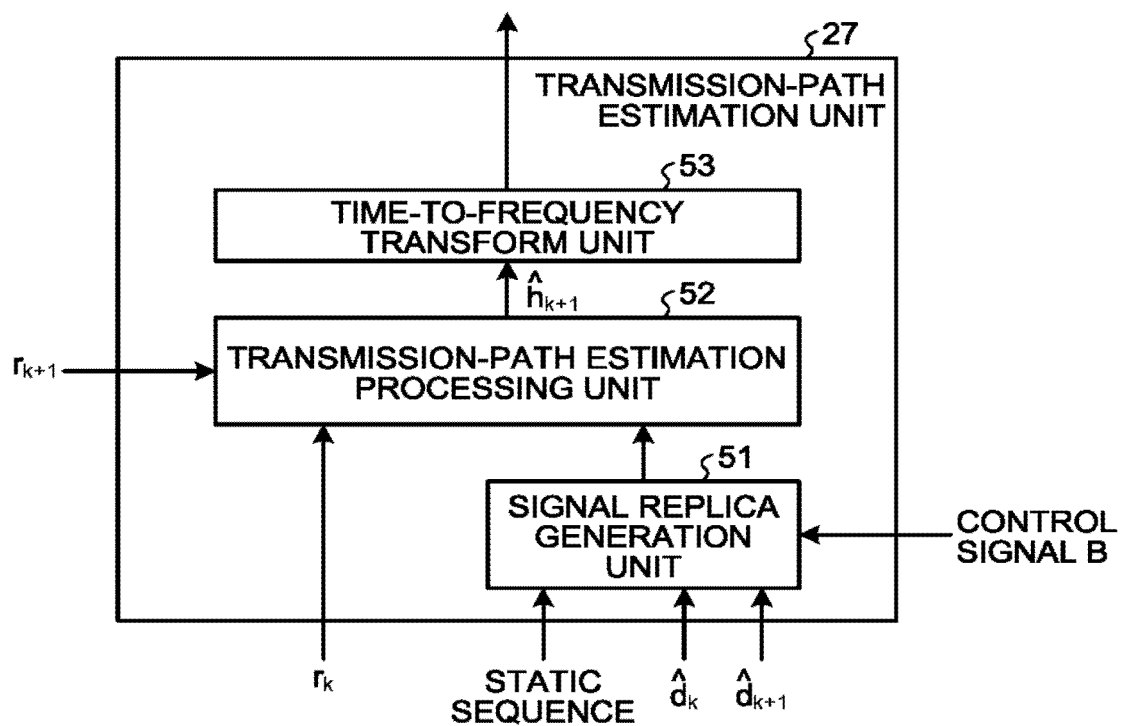
FIG. 9 is a diagram illustrating a configuration example of a transmission-path estimation unit of the reception device according to the second embodiment.

FIG. 9 is a diagram illustrating a configuration example of the transmission-path estimation unit 27. The transmission-path estimation unit 27 includes a signal replica generation unit 51, a transmission-path estimation processing unit 52, and a time-to-frequency transform unit 53. The static sequence and the demodulated data symbols of the input signals to the transmission-path estimation unit 27 described above become input signals to the signal replica generation unit 51. The received signal of the (k+1)-th block and the received signal of the k-th block become input signals to the transmission-path estimation processing unit 52.

The signal replica generation unit 51 generates a first replica formed of static symbols and zero symbols, or a second replica formed of static symbols and data symbols. When a control signal B instructs to generate an initial value of a transmission-path estimation value, the signal replica generation unit 51 generates the first replica. When the signal B instructs to regenerate the transmission-path estimation value, the signal replica generation unit 51 generates the second replica.

The transmission-path estimation processing unit 52 estimates a transmission path on the basis of the received signal of the (k+1)-th block and the received signal of the k-th block, and the signal replica generated by the signal replica generation unit 51. The signal replica generated by the signal replica generation unit 51 is either the first replica or the second replica described above.

The time-to-frequency transform unit 53 transforms the transmission-path estimation value calculated by the transmission-path estimation processing unit 52 from a time-domain signal to a frequency-domain signal.

Figure 10:
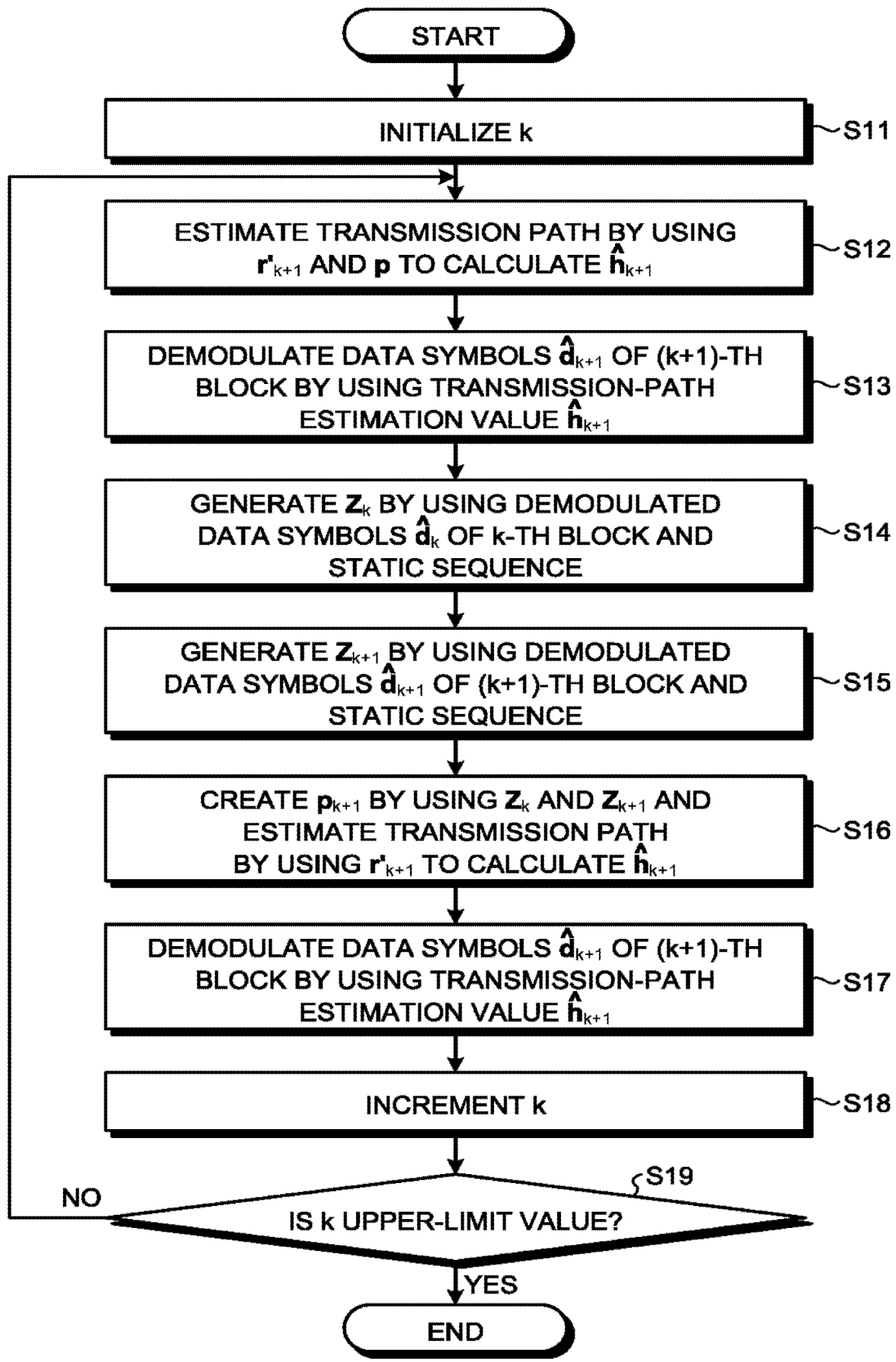
FIG. 10 is a flowchart illustrating an example of an operation of the reception device according to the second embodiment.

FIG. 10 is a flowchart illustrating an example of an operation of the reception device according to the second embodiment. FIG. 10 illustrates the operation of the reception device 2 when the reception device 2 demodulates data symbols transmitted in the (k+1)-th block. With reference to FIG. 10, the operation of the reception device 2, particularly, the operation to calculate a transmission-path estimation value is described below.

First, the reception device 2 initializes k, that is, sets to k=0 (Step S11). Next, the reception device 2 estimates a transmission path by using signal vectors r' (bold-faced)$_{k+1}$ and p(bold-faced) described below, and calculates an initial value of a transmission-path estimation value (Step S12). The transmission-path estimation unit 27 performs this processing at Step S12. At Step S12, the transmission-path estimation unit 27 calculates the transmission-path estimation value in accordance with a procedure described below.

In the transmission-path estimation value calculation processing at Step S12, first the signal replica generation unit 51 in the transmission-path estimation unit 27 divides an in static sequence to generate two vectors expressed by the following equation (7).

[Formula 7]

$$F_0 = \left[F_0, F_1, \ldots, F_{\frac{M}{2}-1}\right]^T \quad (7)$$

$$F_1 = \left[F_{-\frac{M}{2}}, F_{-\frac{M}{2}+1}, \ldots, F_{-1}\right]^T$$

Next, the signal replica generation unit 51 generates a signal vector expressed by the following equation (8) by using the vectors expressed by the equation (7). In the equation (8), 0(bold-faced)$_{N_D-M}$ is a column vector having elements of ($N_D$−M) zeros. The signal vector expressed by the equation (8) is the first replica formed of static symbols and zero symbols. The first replica is equivalent to a signal in which the data symbols in a block signal generated by the transmission device 1 are replaced with zero symbols.

[Formula 8]

$$Z_F = [F_0^T, 0_{N_D-M}^T, \ldots, F_1^T]^T \quad (8)$$

Next, the transmission-path estimation processing unit 52 performs $N_D$-point DFT processing on the signal vector Z(bold-faced)$_F$ expressed by the equation (8). The transmission path estimation processing unit 52 may perform zero padding that is equivalent to the oversampling processing after the DFT processing has been performed, so as to increase the signal points to N points. Any zero padding method may be used therefor. In this example, the oversampling rate is set to L=1.

Next, the transmission-path estimation processing unit 52 performs band reduction processing on $N_D$ signals obtained by performing the DFT processing, in the same manner as the processing performed by the band reduction processing unit 15 in the transmission device 1. That is, the transmission-path estimation processing unit 52 removes a predetermined number of signals in parts of both ends from the $N_D$ signals obtained by performing the DFT processing.

Next, the transmission-path estimation processing unit 52 performs N-point IDFT processing on the signals obtained by performing the band reduction processing. A signal vector obtained by performing the IDFT processing is represented as t(bold-faced)$_z = [t_0, t_1, \ldots, t_{N-1}]^T$. Where the length of static sequence components to be used for estimating a transmission path in the time domain is represented as M' and M' is an even number, a vector p(bold-faced) constructed of known sequence components in the time domain is expressed by the following equation (9).

[Formula 9]

$$p = [p_0, \ldots, p_{M'-1}]^T = \left[t_{N-\frac{M'}{2}}, \ldots, t_{N-1}, t_0, \ldots, t_{\frac{M'}{2}-1}\right]^T \quad (9)$$

The received signal r(bold-faced)$_{k+1}$ of the (k+1)-th block is expressed by the following equation (10). A longest path delay on a multipath transmission channel is represented as P.

[Formula 10]

$$r_{k+1} = [r_{k+1,0}, r_{k+1,3}, \ldots, r_{k+1,N-1}]^T \quad (10)$$

In this case, a received signal satisfied by the received signal of the k-th block and the received signal of the (k+1)-th block can be expressed by the following equation (11).

[Formula 11]

$$r'_{k+1} = \left[\begin{array}{c} r_{k,N-1-\frac{M'}{2}+P-1}, \\ r_{k,N-1-\frac{M'}{2}+L}, \ldots, r_{k,N-1}, r_{k+1,0}, r_{k+1,1}, \ldots, r_{k+1,\frac{M'}{2}-1} \end{array}\right]^T \quad (11)$$

Subsequently, the transmission-path estimation processing unit 52 generates a matrix whose elements are known sequence components, specifically, a matrix expressed by the following equation (12) as a matrix to be used for estimating a transmission path.

[Formula 12]

$$B = \begin{bmatrix} p_{P-1} & \cdots & p_1 & p_0 \\ p_P & \cdots & p_2 & p_1 \\ \vdots & \ddots & \vdots & \vdots \\ p_{M'-1} & \cdots & p_{M'-P+1} & p_{M'-P} \end{bmatrix} \quad (12)$$

Next, the transmission-path estimation processing unit 52 calculates a transmission-path estimation value in accordance with the following equation (13). In the equation (13), "H" represents the Hermitian transpose of a vector. The same applies to other formulas described below.

[Formula 13]

$$\hat{h}_{k+1} = (B^H B)^{-1} B^H r'_{k+1} \quad (13)$$

Subsequently, the time-to-frequency transform unit 53 transforms the transmission-path estimation value calculated by the transmission-path estimation processing unit 52 to a frequency-domain signal. In accordance with the procedure described above, the initial value of the transmission-path estimation value is calculated at Step S12.

Next, the reception device 2 demodulates data symbols of the (k+1)-th block by using the transmission-path estimation value calculated at Step S12 (Step S13). Step S13 is a first demodulating step. The FDE 23, the IDFT unit 24, the static symbol removal unit 25, and the demodulation unit 26, which constitute the block signal demodulation unit 20, performs the processing of Step S13.

That is, using the transmission-path estimation value calculated by the transmission-path estimation unit 27 at Step S12, the FDE 23 performs equalization processing in a frequency domain. The IDFT unit 24 transforms the signal obtained by the equalization processing performed by the SDE 23 to a time-domain signal. The static symbol removal unit 25 then removes static symbol components included in this time-domain signal. The demodulation unit 26 then demodulates data symbols included in the signal from which the static symbol components have been removed.

Subsequently, the reception device 2 uses the data symbols obtained by the demodulation of the k-th block and the static sequence to generate a signal vector Z(bold-faced)$_k$ (Step S14), and uses the data symbols obtained by the demodulation of the (k+1)-th block and the static sequence to generate a signal vector Z(bold-faced)$_{k+1}$ (Step S15). The transmission-path estimation unit 27 performs these processings of Steps S14 and S15.

In the vector generation processing at Steps S14 and S15, the signal replica generation unit 51 in the transmission-path estimation unit 27 uses the demodulated data symbols of the k-th block, the demodulated data symbols of the (k+1)-th block, and the static sequence to generate two signal vectors expressed by the following equation (14). Each of the signal vectors expressed by the equation (14) is equivalent to a vector obtained by replacing (N$_D$−M) zero symbols included in the signal vector expressed by the equation (8) with the demodulated data symbols. The signal vectors expressed by the equation (14) are the second replicas formed of the static symbols and the demodulated data symbols. Z(bold-faced)$_{K+1}$ of the second replicas is equivalent to a signal obtained by replacing the data symbols in the (k+1)-th block signal generated by the transmission device 1 with the demodulated data symbols obtained by demodulating the (k+1)-th block signal using the initial value of the transmission-path estimation value. Z(bold-faced)$_k$ of the second replicas is equivalent to a signal obtained by replacing the data symbols in the k-th block signal generated by the transmission device 1 with the demodulated data symbols of the k-th block.

[Formula 14]

$$Z_k = [F_0^T, \hat{d}_k, F_1^T]^T$$

$$Z_{k+1} = [F_0^T, \hat{d}_{k+1}, F_1^T]^T \quad (14)$$

When Steps S14 and S15 are performed, the control signal A inputted to the control unit 28 illustrated in FIG. 8 instructs the control unit 28 to output the demodulated data symbols of the k-th block and the demodulated data symbols of the (k+1)-th block. Further, the control signal B inputted to the signal replica generation unit 51 instructs the signal replica generation unit 51 to generate a replica using the static sequence and the demodulated data symbols. The control signals A and B are outputted from, for example, a reception control unit (not illustrated) that controls the entire receiving operation of the reception device 2. Although the control signal A inputted to the control unit 28 and the control signal B inputted to the signal replica generation unit 51 are separate signals, these control signals may be modified to be a common control signal. In a case where a common control signal is inputted to the control unit 28 and the signal replica generation unit 51, for example, when the common control signal has a High-level, the control unit 28 outputs demodulated data symbols, while the signal replica generation unit 51 generates the second replica, that is, the signal vector expressed by the equation (14) using the demodulated data symbols and the static sequence. When the common control signal has a Low-level, the control unit 28 does not output demodulated data symbols, while the signal replica generation unit 51 generates the first replica, that is, the signal vector expressed by the equation (8) using zero symbols and the static sequence.

Next, the reception device 2 generates a vector p(bold-faced)$_{k+1}$ using the signal vector generated at Step S14 and the signal vector generated at Step S15, and estimates a transmission path using r(bold-faced)'$_{k+1}$ to obtain the transmission-path estimation value (Step S16). The transmission-path estimation unit 27 performs this processing of Step S16. At Step S16, the transmission-path estimation unit 27 calculates a transmission-path estimation value in accordance with a procedure described below.

In the calculation processing for the transmission-path estimation value at Step S16, first the transmission-path estimation processing unit 52 performs N$_D$-point DFT processing on the signal vector Z(bold-faced)$_{k+1}$ expressed by the equation (14). The transmission-path estimation processing unit 52 may be configured to perform zero padding that is equivalent to the oversampling processing after the DFT processing has been performed so as to increase the signal points to N points. Any zero padding method may be used. In this example, the oversampling rate is set to L=1.

Next, the transmission-path estimation processing unit 52 performs band reduction processing on N$_D$ signals, obtained by performing the DFT processing, in the same manner as the processing performed by the band reduction processing unit 15 in the transmission device 1. That the transmission-path estimation processing unit 52 removes a predetermined number of signals for parts of both ends from the N$_D$ signals obtained by performing the DET processing. Next, the transmission-path estimation processing unit 52 performs N-point IDFT processing on the signals obtained by performing the band reduction processing. A signal vector obtained by performing the IDFT processing is represented as t(bold-faced)$_{k+1}$=[t$_{k+1,0}$, t$_{k+1}$, . . . , t$_{k+1,N-1}$]$^T$.

The transmission-path estimation processing unit 52 performs the processing on the signal vector Z(bold-faced)$_k$ expressed by the equation (14) in the same manner as the processing described above and performed on the signal vector Z(bold-faced)$_{k+1}$. That is, the transmission-path estimation processing unit performs N$_D$-point DFT processing on the signal vector Z (bold-faced)$_k$ expressed by the equation (14), then the band reduction processing, and further N-point IDFT processing. A signal vector obtained by performing the IDFT processing is represented as t(bold-faced)$_k$=[t$_{k,0}$, t$_{k,1}$, . . . ,t$_{k,n-1}$]$^T$.

Next, the transmission-path estimation processing unit 52 generates a signal vector expressed by the following equation (15) using the elements of the signal vectors t(bold-faced)$_k$ and t(bold-faced)$_{k+1}$ described above.

[Formula 15]

$$p_{k+1} = [p_{k+1,0}, \ldots, p_{k+1,M'-1}]^T = \left[ t_{k,N-\frac{M'}{2}}, \ldots, t_{k,N-1}, t_{k+1,0}, \ldots, t_{k+1,\frac{M'}{2}-1} \right]^T \quad (15)$$

Subsequently, the transmission-path estimation processing unit 52 generates a transmission-path matrix expressed by the following equation (16).

[Formula 16]

$$B_{k+1} = \begin{bmatrix} p_{k+1,P-1} & \cdots & p_{k+1,1} & p_{k+1,0} \\ p_{k+1,P} & \cdots & p_{k+1,2} & p_{k+1,1} \\ \vdots & \ddots & \vdots & \vdots \\ p_{k+1,M'-1} & \cdots & p_{k+1,M'-P+1} & p_{k+1,M'-P} \end{bmatrix} \quad (16)$$

Next, the transmission-path estimation processing unit 52 calculates a transmission-path estimation value in accordance with the following equation (17).

[Formula 17]

$$\hat{h}_{k+1} = (B_{k+1}^H B_{k+1})^{-1} B_{k+1}^H r'_{k+1} \quad (17)$$

Subsequently, the time-to-frequency transform unit 53 transforms the transmission-path estimation value calculated by the transmission-path estimation processing unit 52 to a frequency-domain signal, and outputs the transmission-path estimation value in the frequency domain to the FDE 23. In accordance with the procedure described above, the transmission-path estimation value is calculated again at Step S16. Steps S14 to are equivalent to the recalculating step of recalculating the transmission-path estimation value.

Next, the reception device 2 demodulates data symbols of the (k+1)-th block using the transmission-path estimation value calculated at Step S16 (Step S17). Step S17 is a second demodulating step. The FDE 23, the IDFT unit 24, the static symbol removal unit 25, and the demodulation unit 26, which constitute the block signal demodulation unit 20, performs the processing of Step S17. That is, by using the transmission-path estimation value calculated by the transmission-path estimation unit 27 at Step S16, the FDE 23 performs equalization processing in the frequency domain. The IDFT unit 24 transforms the signal obtained by performing the equalization processing by the FDE 23 to a time-domain signal. The static symbol removal unit 25 then removes static symbol components included in this time-domain signal. The demodulation unit 26 then demodulates data symbols included in the signal from which the static symbol components have been removed. The data symbols obtained by the demodulation by the demodulation processing of Step S17 are final demodulated data symbols.

Subsequently, the reception device 2 increments k (Step S18), and then checks whether k has reached an upper-limit value (Step S19). When k is not an upper-limit value (NO at Step S19), the processing flow returns to Step S12, and the reception device 2 continues the processing at Steps S12 to S18. When k is an upper-limit value (YES at Step S19), the reception device 2 ends the processing.

Figure 11:
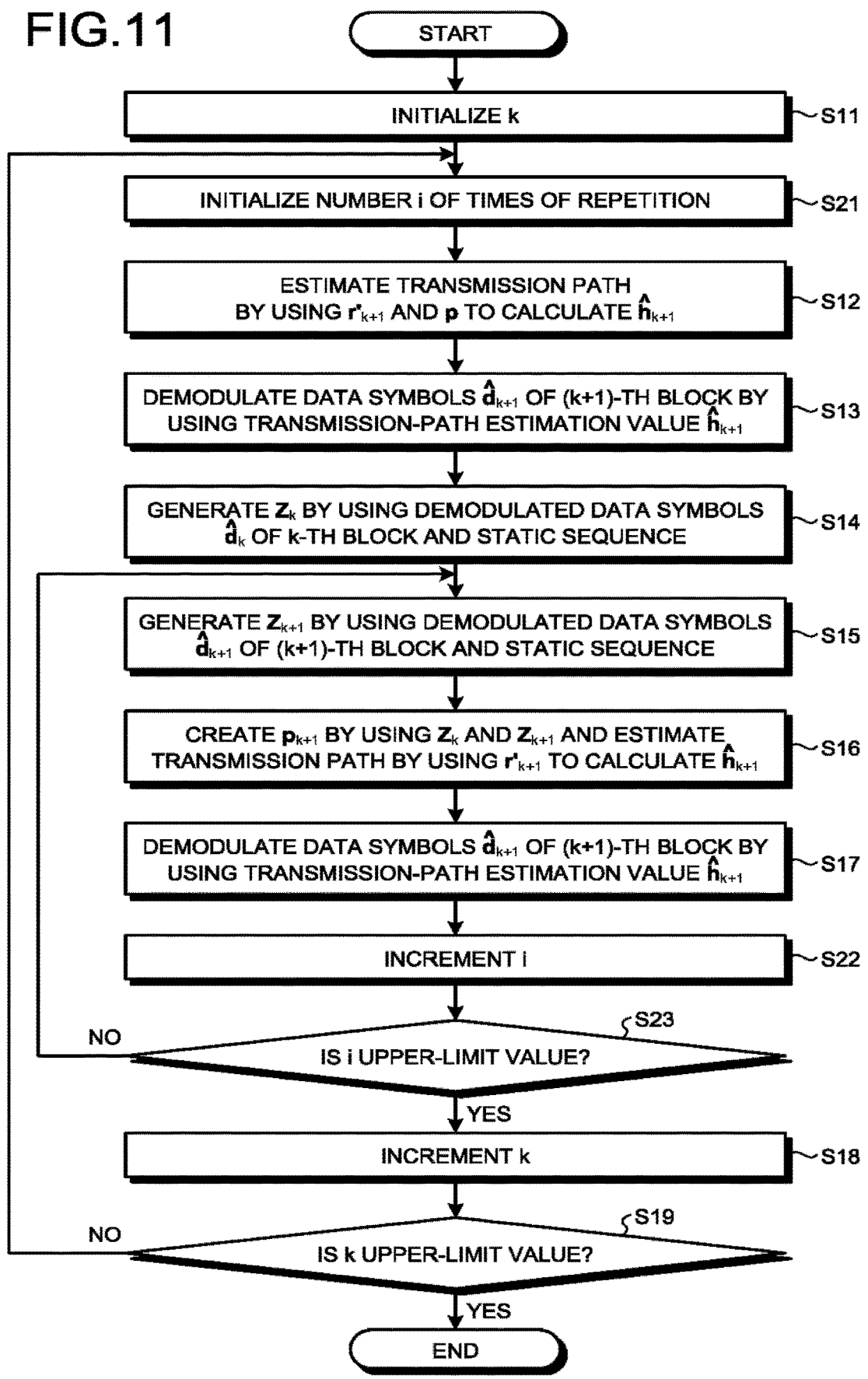
FIG. 11 is a flowchart illustrating another example of the operation of the reception device according to the second embodiment.

In order to improve the accuracy in estimating a transmission path and the demodulation accuracy, the transmission-path estimation processing performed using the demodulated data symbols and the static sequence as described above, and the demodulation processing described above may be repeated a given number of times. FIG. 11 is a flowchart illustrating an operation example when the processing described above is repeated. In the flowchart illustrated in FIG. 11, Step S21 is added between Steps S11 and S12 of the flowchart illustrated in FIG. 10, and further Steps S22 and S23 are added between Steps S17 and S18 of the flowchart illustrated in FIG. 10. At Step S21 that is performed after Step S11, the reception device 2 initializes the number i of times of repetition to i=0. At Step S22 that is performed after Step S17, the reception device 2 increments the number i. At Step S23, the reception device 2 checks whether i has reached an upper-limit value. When i is not an upper-limit value (NO at Step S23), the processing flow returns to Step S15, and the reception device 2 continues the processing of Steps S15 to S22. When i is an upper-limit value (YES at Step S23), the reception device 2 executes Step S18.

A hardware configuration to implement constituent elements of the reception device 2 illustrated in FIG. 8 is described next. In a case where some of the constituent elements of the reception device 2 are implemented by software, the software-implemented constituent element is implemented by a control circuit 200 illustrated in FIG. 12. The control circuit 200 is configured to include an input unit 201, a processor 202, a memory 203, and an output unit 204. The input unit 201 is an interface circuit that receives data inputted from outside and provides the received data to the process 202. The processor 202 is a CPU, a system LSI, or the like. The memory 203 is a nonvolatile or volatile semiconductor memory such as a RAM, a ROM, a flash memory, an EPROM, or an EEPROM, or is a magnetic disk, a flexible disk, an optical disk, a compact disk, a minidisc, a DVD, or the like. The output unit 204 is an interface circuit that transmits data generated by the processor 202 or data read from the memory 203 to outside. In a case where at least some of the constituent elements of the reception device 2 are implemented by the control circuit 200 illustrated in FIG. 12, the partial constituent elements are implemented by the processor 202 reading and executing a program corresponding to each of these partial constituent elements of the reception device 2, which is stored in the memory 203. The memory 203 is used also as a temporary memory for the processor 202 to perform each processing.

Figure 12:
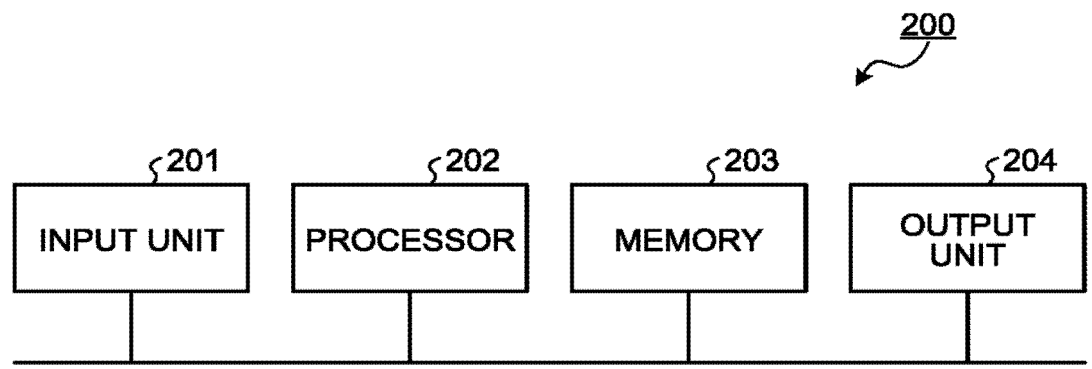
FIG. 12 is a diagram illustrating an example of hardware implementing constituent elements of the reception device according to the second embodiment.
Figure 13:
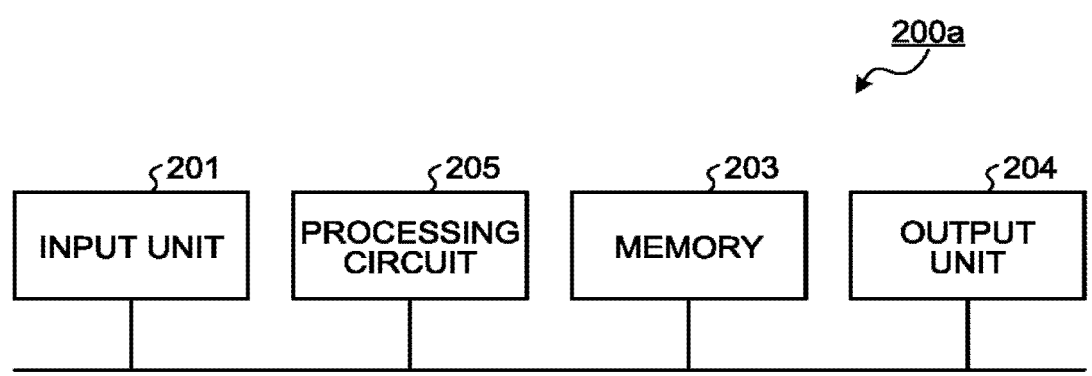
FIG. 13 is a diagram illustrating another example of the hardware implementing constituent elements of the reception device according to the second embodiment.

In a case where each of the constituent elements of the reception device 2 is implemented by dedicated hardware, each of the constituent elements is implemented by a control circuit 200*a* illustrated in FIG. 13. The control circuit 200*a* is configured to include the input unit 201, a processing circuit 205, the memory 203, and the output unit 204. That is, the control circuit 200a corresponds to circuitry obtained by replacing the processor 202 in the control circuit 200 illustrated in FIG. 12 with the processing circuit 205. In the control circuit 200a, the input unit 201 receives data inputted from outside, and provides the received data to the processing circuit 205. The processing circuit 205 is constructed of a number of electronic circuits, each of which perform processing corresponding to each of the constituent elements of the reception device 2 illustrated in FIG. 8. The processing circuit 205 corresponds to any of a single circuit, a composite circuit, a programmed processor, a parallel-programmed processor, an ASIC, a FPGA, or a combination thereof. The output unit 204 transmits data generated by the processing circuit 205 or data read from the memory 203 to outside.

As described above, when the reception device 2 according to the present embodiment receives a (k+1)-th block signal, the reception device 2 first generates a first replica by using static symbols and zero symbols, then calculates an initial value of a transmission-path estimation value on the basis of the generated first replica, the received (k+1)-th block signal, and an immediately-previously received k-th block signal, and demodulates data symbols included in the (k+1)-th block signal by using the calculated initial value. The (k+1)-th block signal is the first block signal. The k-th block signal is the second block signal. Next, the reception device 2 generates a second replica by using the static symbols and the demodulated data symbols obtained by performing demodulation processing using the initial value of the transmission-path estimation value, and recalculates the transmission-path estimation value on the basis of the generated second replica, the (k+1)-th block signal, and the k-th block signal. The reception device 2 then uses the recalculated transmission-path estimation value to demodulates data symbols included in the (k+1)-th block signal. Accordingly, the reception device 2 can improve the accuracy in estimating a transmission path.

Third Embodiment

A reception device according to a third embodiment is described below. In the second embodiment, description has been given for the reception device 2 configured to generate a replica so as to improve the accuracy in estimating a transmission path. In the present embodiment, in contrast, description is given for a reception device configured to remove data symbol components included in a static sequence from a received signal to be used for estimating a transmission path, that is, from the static sequence, so as to improve the accuracy in estimating a transmission path. Explanations for parts common to the reception device 2 according to the second embodiment are omitted.

Figure 14:
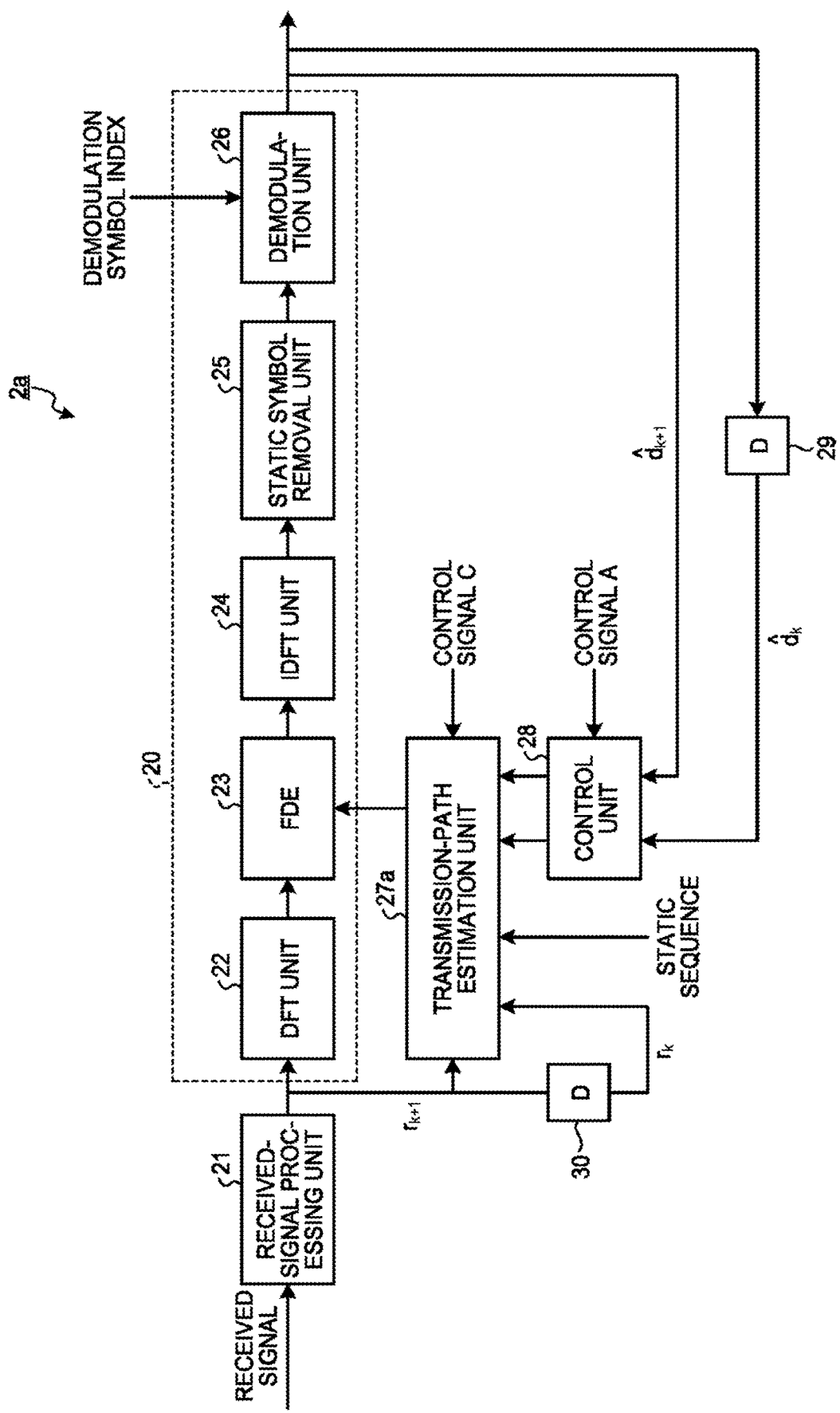
FIG. 14 is a diagram illustrating a configuration example of a reception device according to a third embodiment.

FIG. 14 is a diagram illustrating a configuration example of the reception device according to the third embodiment. A reception device 2a according to the present embodiment is configured by replacing the transmission-path estimation unit 27 in the reception device 2 according to the second embodiment with a transmission-path estimation unit 27a. Constituent elements of the reception device other than the transmission-path estimation unit 27a are identical to those of the reception device 2, and therefore the identical constituent elements are omitted in description. Signals identical to those inputted to the transmission-path estimation unit 27 described in the second embodiment are inputted to the transmission-path estimation unit 27a.

Figure 15:
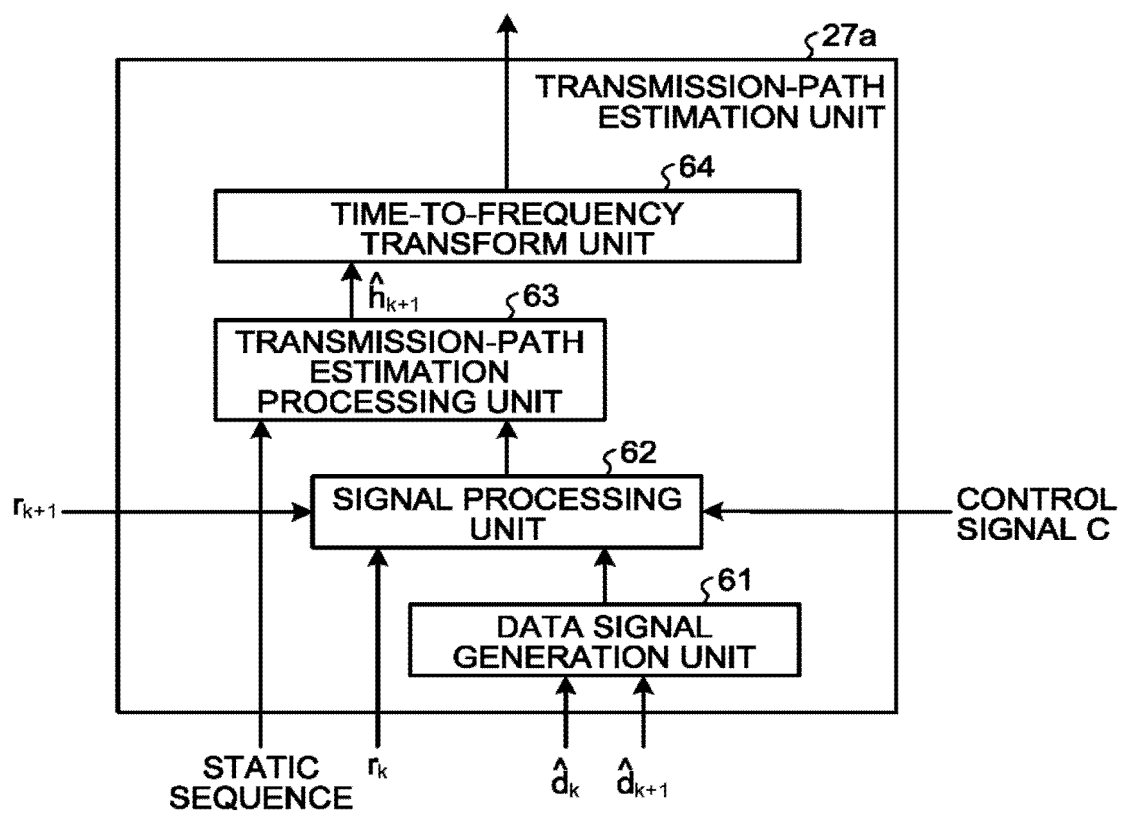
FIG. 15 is a diagram illustrating a configuration example of a transmission-path estimation unit of the reception device according to the third embodiment.

FIG. 15 is a diagram illustrating a configuration example of the transmission-path estimation unit 27a. The transmission-path estimation unit 27a includes a data signal generation unit 61, a signal processing unit 62, a transmission-path estimation processing unit 63, and a time-to-frequency transform unit 64. The time-to-frequency transform unit 64 performs processing similar to that in the time-to-frequency transform unit 53 in the transmission-path estimation unit 27 illustrated in FIG. and so detailed descriptions thereof are omitted. Demodulated data symbols of the input signals to the transmission-path estimation unit 27a become input signals to the data signal generation unit 61. A received signal of the (k+1)-th block and a received signal of the k-th block become input signals to the signal processing unit 62. A static sequence becomes an input signal to the transmission-path estimation processing unit 63.

On the basis of the demodulated data symbols, the data signal generation unit 61 generates a signal vector formed including the demodulated data symbols and zero symbols.

On the basis of the signal vector generated by the data signal generation unit 61, the signal processing unit 62 removes data symbol components from the received signal.

The transmission-path estimation processing unit 63 estimates a transmission path on the basis of the static sequence and an input signal from the signal processing unit 62.

Figure 16:
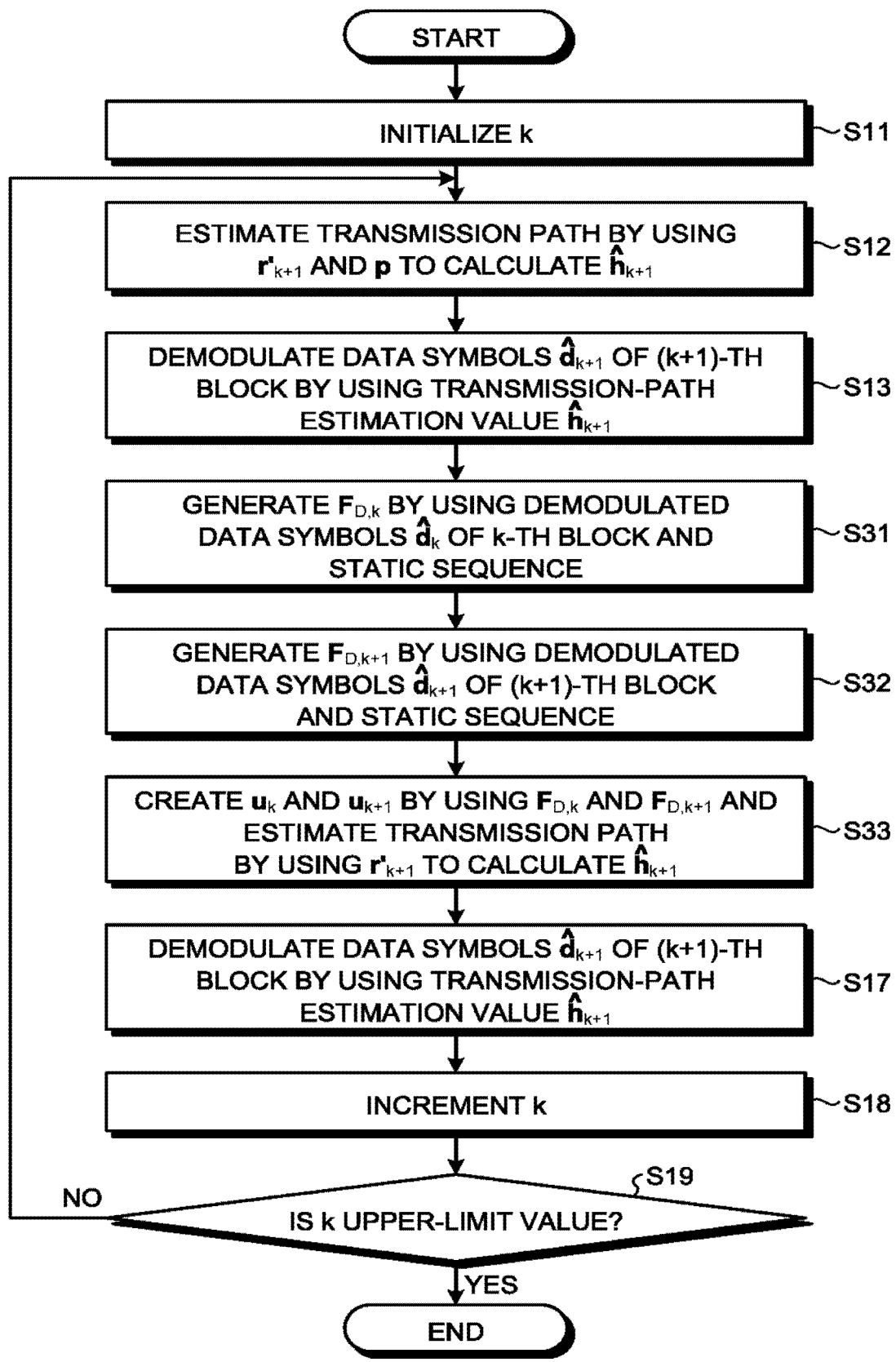
FIG. 16 is a flowchart illustrating an example of an operation of the reception device according to the third embodiment.

FIG. 16 a flowchart illustrating an example of the operation of the reception device according to the third embodiment. FIG. 16 illustrates the operation of the reception device 2a when the reception device 2a demodulates data symbols transmitted in the (k+1)-th block. The flowchart illustrated in FIG. 16 is equivalent to a flowchart in which Steps S14 to S16 of the flowchart illustrated in FIG. 10, that is, the flowchart illustrating the operation of the reception device 2 according to the second embodiment, are replaced with Steps S31 to S33. Therefore, Steps S11 to S13 and steps S17 to S19 which are common between the second and third embodiments, are omitted in description. At Step S12 illustrated in FIG. 16, the transmission-path estimation processing unit 63 performs processing to obtain an initial value of a transmission-path estimation value described in the second embodiment. At this time, the signal processing unit 62 outputs a received signal $r(\text{bold-faced})_{k+1}$ of the (k+1)-th block and a received signal $r(\text{bold-faced})_k$ of the k-th block to the transmission-path estimation processing unit 63. That is, when a control signal C instructs to calculate an initial value of a transmission-path estimation value, the signal processing unit 62 outputs the received signals $r(\text{bold-faced})_{k+1}$ and $r(\text{bold-faced})_k$ to the transmission-path estimation processing unit 63. When the control signal C does not instruct to calculate an initial value of a transmission-path estimation value, the signal processing unit 62 performs processing described later, and removes data symbol components from the received signal.

When the processing of Step S13 is ended, the reception device 2a generates a signal vector $F(\text{bold-faced})_{D,k}$ by using the data symbols obtained by the demodulation of the k-th block and the static sequence (Step S31), and generates a signal vector $F(\text{bold-faced})_{D,k+1}$ by using the data symbols obtained by the demodulation the (k+1)-th block and the static sequence (Step S32). The transmission-path estimation unit 27a performs these processings of Steps S31 and S32.

In the vector generation processing at Steps 331 and S32, the data signal generation unit 61 in the transmission-path estimation unit 27a uses the demodulated data symbols of the k-th block, the demodulated data symbols of the (k+1)-th block, and the static sequence to generate two signal vectors expressed by the following equation (18).

[Formula 18]

$$F_{D,k+1} = \left[0_{\frac{M}{2}}^T, \hat{d}_{k+1}, 0_{\frac{M}{2}}^T\right]^T \quad (18)$$
$$F_{D,k} = \left[0_{\frac{M}{2}}^T, \hat{d}_k, 0_{\frac{M}{2}}^T\right]^T$$

Each of the signal vectors expressed by the equation (18) is formed including the demodulated data symbols and zero symbols. Specifically, one group of M/2 zero symbols and another group of M/2 zero symbols are arranged before and after the demodulated data symbols, respectively. A signal received by the reception device 2a from the transmission device 1 has a formation in which M/2 static symbols are arranged before the data symbols and M/2 static symbols are arranged after the data symbols. For this reason, it is possible to remove data symbol components from the received signal using the signal vector expressed by the equation (18), and generate a signal including only a sequence of static symbols. F(bold-faced)$_{D,k+1}$ of the signal vectors expressed by the equation (18) is equivalent to a signal in which the static symbols in a block signal generated by the transmission device 1 are replaced with zero symbols, and further the data symbols are replaced with the demodulated data symbols obtained by demodulating the (k+1)-th block signal using the initial value of the transmission-path estimation value. F(bold-faced)$_{D,k}$ of the signal vectors is equivalent to a signal in which the static symbols in the k-th block signal generated by the transmission device are replaced with zero symbols, and further the data symbols are replaced with the demodulated data symbols of the k-th block.

Next, the reception device 2a produces u(bold-faced)$_k$ and u(bold-faced)$_{k+1}$ using F(bold-faced)$_{D,k}$ and F(bold-faced)$_{D,k+1}$ generated at Steps S31 and S32, then estimates a transmission path using the signal vector r'$_{k+1}$, and calculates the transmission-path estimation value (Step S33). The transmission-path estimation unit 27a performs this processing of Step S33. At Step S33, the transmission-path estimation unit 27a calculates a transmission-path estimation value in accordance with a procedure described below.

In the calculation processing for a transmission-path estimation value at Step S33, first the signal processing unit 62 performs N$_D$-point DFT processing on the signal vector F(bold-faced)$_{D,k+1}$ expressed by the equation (18). The signal processing unit 62 may perform zero padding that is equivalent to oversampling processing after the DFT processing has been performed so as to increase the signal points to N points. Any zero padding method may be used. In this example, the oversampling rate is set to L=1.

Next, the signal processing unit 62 performs band reduction processing on N$_D$ signals obtained by performing the DFT processing, in the same manner as the processing performed by the band reduction processing unit 15 in the transmission device 1. That is, the signal processing unit 62 removes a predetermined number of signals in parts of both ends from the N$_D$ signals obtained by performing the DFT processing. Next, the transmission-path estimation processing unit 63 performs N-point IDFT processing on the signals obtained by performing the band reduction processing. A signal vector obtained by performing the IDFT processing is represented as u(bold-faced)$_{k+1}$=[u$_{k+1,0}$, u$_{k+1,1}$, ..., u$_{k+1,N-}$]$^T$.

The signal processing unit 62 performs processing on the signal vector F(bold-faced)$_{D,k}$ expressed by the equation (18) in the same manner as the processing described above and performed on the signal vector F(bold-faced)$_{D,K+1}$. That is, the signal processing unit 62 performs N$_D$-point DFT processing on the signal vector F(bold-faced)$_{D,k}$ expressed by the equation (18), then performs band reduction processing, and further performs N-point IDFT processing. A signal vector obtained by performing the IDFT processing is represented as u(bold-faced)$_k$=[u$_{k,0}$, u$_{k,1}$, ..., u$_{l,N-1}$]$^T$.

Next, the signal processing unit 62 generates a vector expressed by the following equation (19) using the elements of the signal vectors u(bold-faced)$_k$ and u(bold-faced)$_{k+1}$ described above.

[Formula 19]

$$q_{k+1} = [q_{k+1,0}, \ldots, q_{k+1,M'-1}]^T = \left[u_{k,N-\frac{M'}{2}}, \ldots, u_{k,N-1}, u_{k+1,0}, \ldots, u_{k+1,\frac{M'}{2}-1}\right]^T \quad (19)$$

Subsequently, the signal processing unit 62 generates a matrix expressed by the following equation (20).

[Formula 20]

$$C_{k+1} = \begin{bmatrix} q_{k+1,P-1} & \cdots & q_{k+1,1} & q_{k+1,0} \\ q_{k+1,P} & \cdots & q_{k+1,2} & q_{k+1,1} \\ \vdots & \ddots & \vdots & \vdots \\ q_{k+1,M'-1} & \cdots & q_{k+1,M'-P+1} & q_{k+1,M'-P} \end{bmatrix} \quad (20)$$

Next, the signal processing unit 62 generates a signal vector expressed by the following equation (21) by using the received signal of the (k+1)-th block and the matrix expressed by the equation (20). The signal vector expressed by the equation (21) is a replica including only static symbols, that is, a replica of a signal obtained by removing the data symbol components from the received signal. The signal processing unit 62 outputs the generated replica to the transmission-path estimation processing unit 63.

[Formula 21]

$$r'_{k+1} = r'_{k+1} - C_{k+1}\hat{b}_k + 1 \quad (21)$$

Next, the transmission-path estimation processing unit 63 estimates a transmission path using the replica received from the signal processing unit 62, that is, static symbol components.

Figure 17:
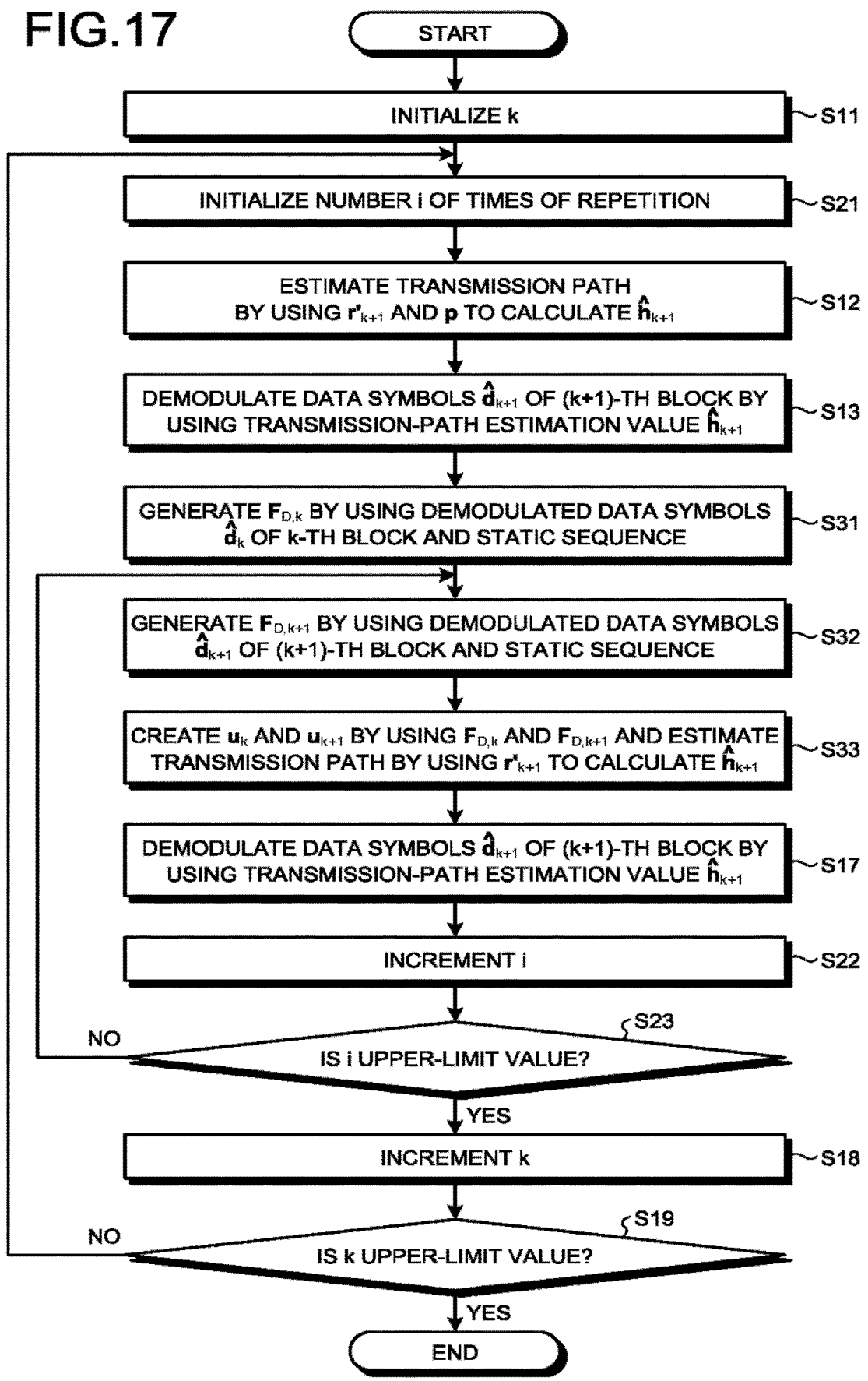
FIG. 17 is a flowchart illustrating another example of the operation of the reception device according to the third embodiment.

Similarly to the second embodiment, in order to improve the accuracy in estimating a transmission path and the demodulation accuracy, the transmission-path estimation processing performed using the demodulated data symbols and the static sequence as described above, and the demodulation processing described above may be repeated. FIG. 17 is a flowchart illustrating an operation example when the processings described above are repeated. In the flowchart illustrated in FIG. 17, Step S21 is added between Steps S11 and S12 of the flowchart illustrated in FIG. 16, and further Steps S22 and S23 are added between Steps S17 and S18 of the flowchart illustrated in FIG. 16. Steps S21, S22, and S23 in FIG. 17 have the same processings as Steps S21, S22, and S23 in FIG. 11 which have been described in the second embodiment. However, when a determination result of Step S23 is "NO", the processing flow returns to Step S32.

It is possible to implement each constituent element of the reception device 2a based on hardware illustrated in FIG. 12 or FIG. 13 as with the reception device 2 according to the second embodiment.

As described above, when the reception device 2a according to the present embodiment receives the (k+1)-th block signal, the reception device 2a first calculates an initial value of a transmission-path estimation value, and demodulates data symbols included in the (k+1)-th block signal by using the calculated initial value. Next, the reception device 2a uses the data symbols obtained by the demodulation to generate a replica of a signal obtained by removing data symbol components from a received signal, and recalculates the transmission-path estimation value on the basis of the static symbol components included in the generated replica. The reception device 2a then uses the recalculated transmission-path estimation value to demodulate data symbols included in the (k+1)-th block signal. Accordingly, the reception device 2a can improve the accuracy in estimating a transmission path.

Fourth Embodiment

Figure 18:
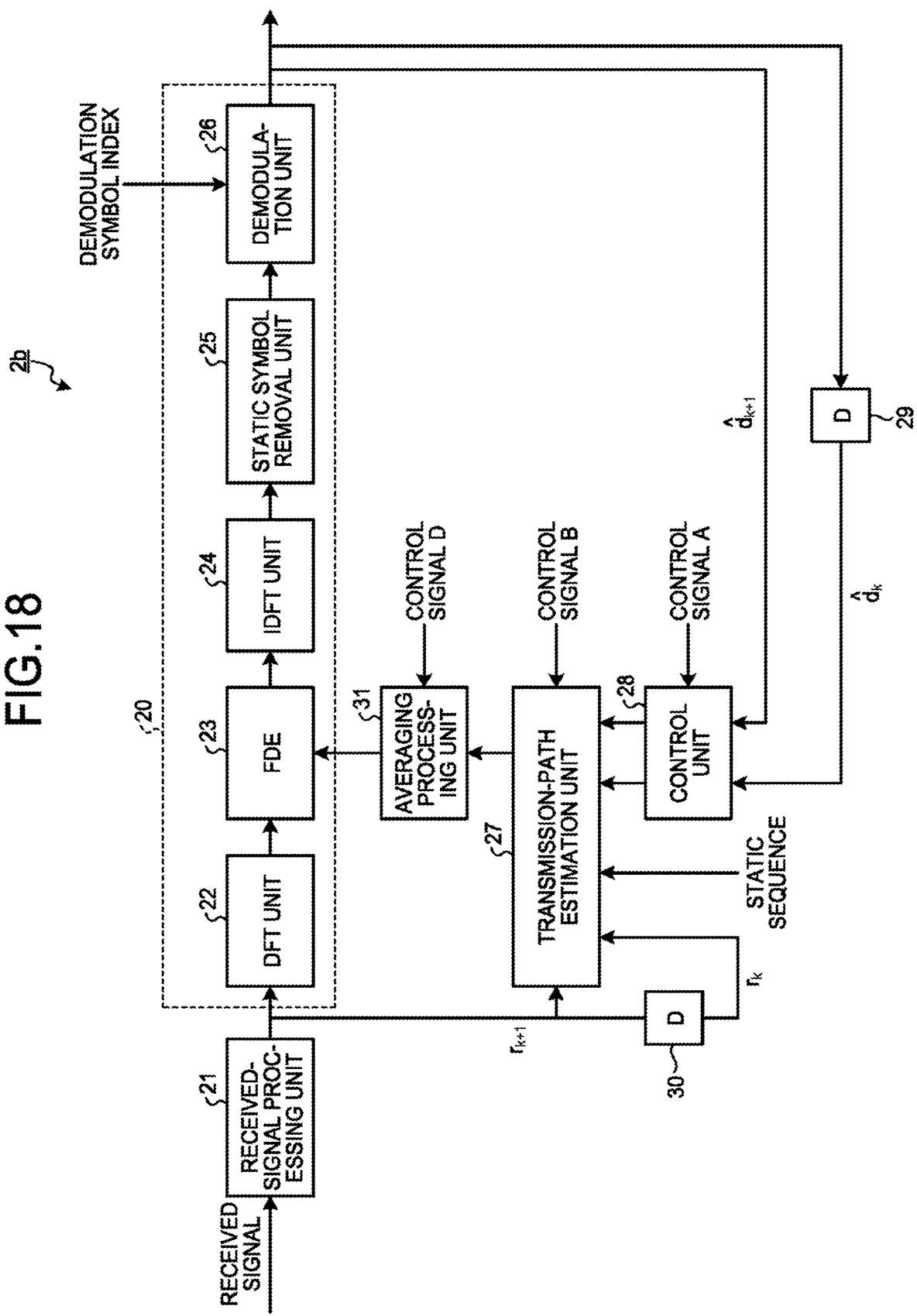
FIG. 18 is a diagram illustrating a configuration example of a reception device according to a fourth embodiment.

FIG. 18 is a diagram illustrating a configuration example of a reception device according to a fourth embodiment. A reception device 2b according to the present embodiment has a configuration in which an averaging processing unit 31 is added to the reception device 2 according to the second embodiment.

The transmission-path estimation value calculated by the transmission-path estimation unit 27 and a control signal D are inputted to the averaging processing unit 31. The control signal D is a signal that instructs the averaging processing unit 31 whether to perform averaging processing. When the control signal D instructs the averaging processing unit 31 to perform the averaging processing, the averaging processing unit 31 averages the transmission-path estimation values outputted from the transmission-path estimation unit 27 in a frequency domain. The averaging processing unit 31 holds transmission-path estimation values obtained before and after an averaging processing time k, and then calculates an average value of the transmission-path estimation values held therein to output the average value to the FDE 23. Where the transmission-path estimation value in the frequency domain outputted from the transmission-path estimation unit 27 is represented as f(bold-faced)$_{k+1}$, the averaging processing unit 31 performs the averaging processing expressed by the following equation (22) to calculate an average value of the transmission-path estimation values.

[Formula 22]

$$f_{k+1} = \frac{1}{I_1 + I_2}\left(\sum_{i=0}^{I_1-1} f_{k-i} + \sum_{i=1}^{I_2} f_{k+i}\right) \quad (22)$$

The averaging processing unit 31 averages the transmission-path estimation values between blocks, thereby further improving the accuracy in estimating a transmission path. With this improvement, the demodulation accuracy also improves. In the present embodiment, an example has been described in which the average value of the transmission-path estimation values is calculated in the frequency domain. However, the averaging processing may be performed in a time domain.

The constituent elements of the reception device 2b can be realized by the hardware illustrated in FIGS. 12 and 13 as with the reception device 2 according to the second embodiment.

The configurations described in the above embodiments are intended to show examples of the content of the present invention. The configurations can be combined with other publicly known techniques, and a part of each configuration can be omitted and/or modified without departing from the scope of the present invention.

REFERENCE SIGNS LIST 1 transmission device; 2, 2a, 2b reception device; 11 static sequence generation unit; 12 data symbol generation unit; multiplexing unit; 14, 22 DFT unit; 15 band reduction processing unit; 16 interpolation processing unit; 17, 24 IDFT unit; 18 transmission unit; 20 block signal demodulation unit; 21 received-signal processing unit; 23 FDE; 25 static symbol removal unit; 26 demodulation unit; 27, 27a transmission-path estimation unit; 28 control unit; 29, 30 storage unit; 31 averaging processing unit; 51 signal replica generation unit; 52, 63 transmission-path estimation processing unit; 53, 64 time-to-frequency transform unit; 61 data signal generation unit; 62 signal processing unit.

The invention claimed is:

1. A transmission device comprising:
processing circuitry configured to
generate data symbols;
generate a sequence of static symbols;
generate a block signal based on the data symbols and the sequence of the static symbols, the block signal having the static symbols arranged in a leading part and a trailing part of the block signal, and having the data symbols arranged in a remaining central part of the block signal;
transform the block signal to a frequency-domain signal;
remove a predetermined number of signals in parts of both ends from the block signal after having been transformed to the frequency-domain signal;
perform interpolation processing on the block signal after the predetermined number of signals in parts of both ends have been removed;
transform the block signal after having undergone the interpolation processing to a time-domain signal; and
transmit the block signal, after having been transformed to the time-domain signal, to a counterpart device.

2. The transmission device according to claim 1, wherein the processing circuitry divides the sequence of static symbols into a first sequence on a leading side and a second sequence on a trailing side, and adds the second sequence to a leading end of the data symbols, while adding the first sequence to a trailing end of the data symbols to generate the block signal.

3. A communication device comprising the transmission device according to claim 1.

4. A reception device to receive a block signal transmitted from the transmission device according to claim 1, the reception device comprising:
processing circuitry configured to
calculate a transmission-path estimation value on the basis of the static symbols included in the block signal; and
demodulate the block signal on the basis of the calculated transmission-path estimation value, wherein
the processing circuitry calculates an initial value of the transmission-path estimation value on the basis of static symbols included in a first block signal that is a block signal to be demodulated, and recalculates a new transmission-path estimation value on the basis of a result obtained by demodulating data symbols included in the first block signal using the initial value and a result of demodulation of data symbols included in a second block signal that is a block signal having been received immediately-previously to the first block signal, and when the processing circuitry recalculates the new transmission-path estimation value, the processing circuitry demodulates the first block signal again using the recalculated transmission-path estimation value.

5. The reception device according to claim 4, wherein the processing circuitry is further configured to:

generate a first replica formed of static symbols and zero symbols when the initial value is calculated, and generate a second replica formed of static symbols and data symbols when the new transmission-path estimation value is recalculated;

calculate the initial value on the basis of the first replica, and recalculate the new transmission-path estimation value on the basis of the second replica; and transform a calculated transmission-path estimation value to a frequency-domain signal, generate, as the first replica, a signal obtained by replacing data symbols in the block signal generated by the transmission device with zero symbols, and generate, as the second replica, a signal obtained by replacing data symbols in the block signal generated by the transmission device with the data symbols obtained by demodulating the first block signal using the initial value, and a signal obtained by replacing the data symbols in a block signal generated by the transmission device with the data symbols obtained by demodulating the second block signal.

6. The reception device according to claim 5, wherein for generating the first replica, the processing circuitry generates a time-domain signal formed of the static symbols and the zero symbols, transforms the time-domain signal to a frequency-domain signal using Fourier transform, performs band reduction to remove a predetermined number of signals in parts of both ends of the frequency-domain signal, performs interpolation processing on the signal whose band has been reduced, and performs inverse Fourier transform on a signal after having undergone the interpolation processing.

7. The reception device according to claim 5, wherein for generating the second replica, the processing circuitry generates a time-domain signal formed of the static symbols and the data symbols obtained by demodulating the first block signal, and a time-domain signal formed of the static symbols and the data symbols obtained by demodulating the second block signal, transforms each of the time-domain signals to a frequency-domain signal using Fourier transform, performs band reduction to remove a predetermined number of signals in parts for both ends of each frequency-domain signal, performs interpolation processing on said each frequency-domain signal whose band has been reduced, and performs inverse Fourier transform on each signal after having undergone the interpolation processing.

8. The reception device according to claim 4, wherein the processing circuitry is configured to:

perform signal generation processing for generating a signal obtained by replacing static symbols in a block signal generated by the transmission device with zero symbols, and further replacing data symbols with the demodulated data symbols obtained by demodulating the first block signal using the initial value, and another signal obtained by replacing static symbols in a block signal generated by the transmission device with zero symbols, and further replacing data symbols with the demodulated data symbols obtained by demodulating the second block signal;

generate a signal obtained by removing data symbol components from the first block signal on the basis of a signal generated when the transmission-path estimation value is recalculated;

calculate the initial value on the basis of static symbols included in the first block signal, and to recalculate the transmission-path estimation value on the basis of the first block signal after data symbol components have been removed; and transform a calculated transmission-path estimation value to a frequency-domain signal.

9. The reception device according to claim 8, wherein for the signal generation processing, the processing circuitry generates a time-domain signal in which the static symbols in the block signal generated by the transmission device are replaced with zero symbols, and further the data symbols are replaced with demodulated data symbols obtained by demodulating the first block signal or the second block signal, performs Fourier transform on the generated time-domain signal to transform the time-domain signal to a frequency-domain signal, performs band reduction to remove a predetermined number of signals in parts of both ends of the frequency-domain signal, performs interpolation processing on the signal whose band has been reduced, and performs inverse Fourier transform on a signal after having undergone the interpolation processing.

10. The reception device according to claim 4, wherein processing for the processing circuitry to recalculate the new transmission-path estimation value on the basis of a result obtained by demodulating data symbols included in the first block signal using the initial value, and a result of demodulation of data symbols included in the second block signal, and processing to demodulate the first block signal on the basis of the new recalculated transmission-path estimation value are performed repeatedly a given number of times.

11. The reception device according to claim 4, wherein the processing circuitry is configured to calculate an average value of calculated transmission-path estimation values, wherein the processing circuitry demodulates the block signal on the basis of the calculated average value.

12. A communication device comprising the reception device according to claim 4.

13. A demodulation method for demodulating a block signal transmitted from the transmission device according to claim 1 and received by a reception device, the demodulation method comprising:

an initial value calculating step of calculating an initial value of a transmission-path estimation value on the basis of static symbols included in a first block signal that is a block signal to be demodulated;

a first demodulating step of demodulating data symbols included in the first block signal using the initial value;

a recalculating step of recalculating a new transmission-path estimation value on the basis of a result of demodulation in the first demodulating step, and a result of demodulation of data symbols included in a second block signal that is a block signal having been received immediately-previously to the first block signal; and a second demodulating step of demodulating data symbols included in the first block signal again using a transmission-path estimation value calculated in the recalculating step.

14. A transmission signal generation method to be executed by a transmission device in a communication system that includes the transmission device and a reception device and performs single-carrier block transmission, the transmission signal generation method comprising:
- a data symbol generating step of generating data symbols;
- a static sequence generating step of generating a sequence of static symbols;
- a block signal generating step of generating a block signal based on the data symbols and the sequence of static symbols, where static symbols are arranged in a leading part and a trailing part of the block signal, while data symbols are arranged in a remaining central part of the block signal;
- a time-to-frequency transform step of transforming the block signal to a frequency-domain signal;
- a band reducing step of removing a predetermined number of signals in parts for both ends from the block signal after having been transformed to the frequency-domain signal;
- an interpolating step of performing interpolation processing on the block signal after the predetermined number of signals in parts for both ends have been removed in the band reducing step; and
- a frequency-to-time transform step of transforming the block signal after having undergone the interpolation processing to a time-domain signal.

* * * * *